(12) United States Patent
Farrish

(10) Patent No.: US 9,408,374 B2
(45) Date of Patent: Aug. 9, 2016

(54) HANG ON GLASS UPFLOW ALGAE SCRUBBER EMBODIMENTS

(71) Applicant: Bryan H. Farrish, Santa Monica, CA (US)

(72) Inventor: Bryan H. Farrish, Santa Monica, CA (US)

(*) Notice: Subject to any disclaimer, the term of this patent is extended or adjusted under 35 U.S.C. 154(b) by 0 days.

(21) Appl. No.: 14/292,145

(22) PCT Filed: Dec. 21, 2012

(86) PCT No.: PCT/US2012/071484
§ 371 (c)(1),
(2) Date: May 30, 2014

(87) PCT Pub. No.: WO2013/101775
PCT Pub. Date: Jul. 4, 2013

(65) Prior Publication Data
US 2015/0027938 A1    Jan. 29, 2015

Related U.S. Application Data

(60) Provisional application No. 61/580,245, filed on Dec. 25, 2011, provisional application No. 61/593,203, (Continued)

(51) Int. Cl.
*A01K 63/04* (2006.01)
*C02F 3/32* (2006.01)
(Continued)

(52) U.S. Cl.
CPC .............. *A01K 63/045* (2013.01); *A01K 63/04* (2013.01); *C02F 3/322* (2013.01); *C02F 3/06* (2013.01);
(Continued)

(58) Field of Classification Search
CPC ........ A01K 63/045; A01K 63/04; C02F 3/06; C02F 3/101; C02F 3/223; C02F 3/322; C02F 2301/10; C02F 2203/006; C02F 2303/20; Y02W 10/15

USPC .................. 210/167.22, 167.26, 167.27, 602; 119/260, 261

See application file for complete search history.

(56) References Cited

U.S. PATENT DOCUMENTS 5,097,795 A * 3/1992 Adey ..................... A01K 63/04
119/226
5,176,100 A * 1/1993 Fujino ................... A01K 63/04
119/227

(Continued)

FOREIGN PATENT DOCUMENTS

WO    WO-2011089077    7/2011

OTHER PUBLICATIONS

PCT Search Report No. PCT/US2012/071484, mailed Apr. 29, 2013.
PCT Search Report No. PCT/US2012/071484; Date of mailing: Jul. 10, 2014.

*Primary Examiner* — Fred Prince
(74) *Attorney, Agent, or Firm* — Blakely Sokoloff Taylor & Zafman LLP

(57) ABSTRACT

An apparatus for aquarium water filtration comprising a macroalgal growth means defining a first macroalgal attachment material and a first bubbling means; and a containment means including a housing defining a first water inlet and a gas outlet; a docking means defining a first docking surface configured to complement a shape of an aquarium wall; the first docking surface defining a first illumination port to enable illumination to pass through the illumination port to illuminate the macroalgal attachment material; and a first coupling means to secure the macroalgal growth means to the containment means such that a first portion of gas bubbles emitted by the macroalgal growth means is confined to the housing.

20 Claims, 17 Drawing Sheets

Related U.S. Application Data filed on Jan. 31, 2012, provisional application No. 61/621,346, filed on Apr. 6, 2012, provisional application No. 61/640,687, filed on Apr. 30, 2012, provisional application No. 61/646,282, filed on May 12, 2012, provisional application No. 61/654,084, filed on Jun. 1, 2012, provisional application No. 61/724,260, filed on Nov. 8, 2012.

(51) Int. Cl.
  *C02F 3/06* (2006.01)
  *C02F 3/10* (2006.01)
  *C02F 3/22* (2006.01)

(52) U.S. Cl.
  CPC ............... *C02F 3/101* (2013.01); *C02F 3/223* (2013.01); *C02F 2203/006* (2013.01); *C02F 2301/10* (2013.01); *C02F 2303/20* (2013.01); *Y02W 10/15* (2015.05)

(56) References Cited

U.S. PATENT DOCUMENTS

| | | | |
|---|---|---|---|
| 5,536,398 A | * | 7/1996 | Reinke ............... A01K 63/045 119/260 |
| 2007/0251867 A1 | | 11/2007 | Mihlbauer et al. |
| 2007/0262008 A1 | | 11/2007 | Mihlbauer et al. |
| 2008/0194015 A1 | | 8/2008 | Chen et al. |
| 2009/0120860 A1 | | 5/2009 | Tsai et al. |

\* cited by examiner

HANG ON GLASS UPFLOW ALGAE SCRUBBER EMBODIMENTS

CROSS-REFERENCE TO RELATED APPLICATIONS

This patent application is a U.S. National Phase application under 35 U.S.C. 371 of International application number PCT/US2012/071484 filed Dec. 21, 2012 entitled HANG ON GLASS UPFLOW ALGAE SCRUBBER EMBODIMENTS, which claims priority from International Application No. PCT/US12/31714, filed Mar. 31, 2012 which claims priority from U.S. Provisional Application No. 61/724,260, filed Nov. 8, 2012 which claims priority from U.S. Provisional Application No. 61/654,084, filed Jun. 1, 2012 which claims priority of U.S. Provisional Application No. 61/646,282, filed May 12, 2012 which claims priority of U.S. Provisional Application No. 61/640,687, filed Apr. 30, 2012 which claims priority of U.S. Provisional Application No. 61/621,346, filed Apr. 6, 2012 which claims priority of U.S. Provisional Application No. 61/593,203, filed Jan. 31, 2012 which claims priority of U.S. Provisional Application No. 61/580,245, filed Dec. 25, 2011.

FIELD

The embodiments of the invention generally relate to an upflow algae scrubber that filters aquarium water of nutrients while using illumination from outside the aquarium, and also removes gas bubbles before they enter the aquarium.

BACKGROUND

Aquaria rely on "clean" water for proper operation. In the current application, "clean" is defined as water that is low in nutrients, specifically: Inorganic Nitrate, Inorganic Phosphate, Nitrite, Ammonia, Ammonium, and metals such as Copper. These nutrients cause problems in aquariums such as excessive algae and bacteria growth, and in some cases, poisoning of livestock (copper will kill most corals.) In these instances, algae disperse in the water in an uncontrolled manner, thereby making algae removal difficult. Thus, in aquaria there is a desire to remove nutrients and associated algae from the water to maintain "clean" water. "Scrubbing" is defined to mean the removal of these nutrients, using attached macroalgal growth which is periodically harvested. An "algae scrubber" is defined to be an apparatus which grows macroalgae to perform this scrubbing function.

The past several years have seen many algae scrubbers designed and built, mostly of the "waterfall" variety. The waterfall design does filter well, but is required to be placed over a body of water, so that the waterfall can "drain down" to the body of water. This placement can become cumbersome for an aquarium or sump.

DETAILED DESCRIPTION

Figure 1:
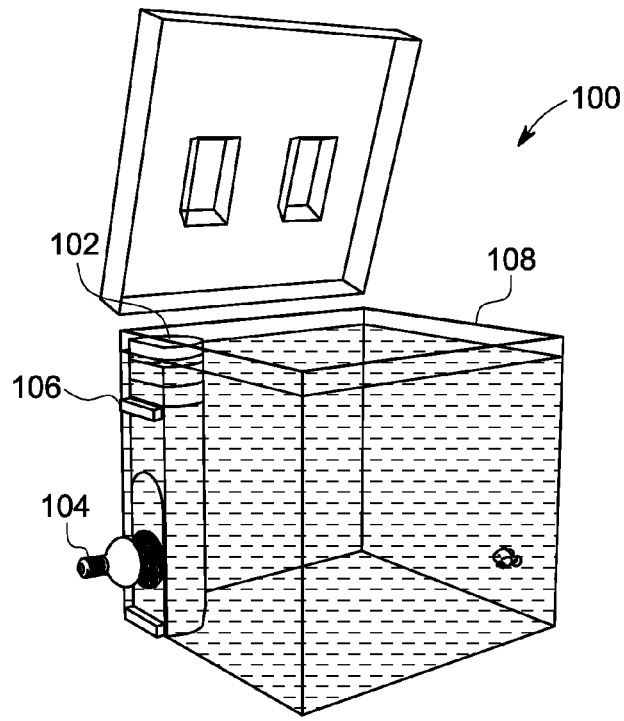
FIG. 1 is a frontal perspective view of an aquarium with an Upflow Algae Scrubber (UAS) with a "hang on glass" bubble-remover embodiment.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Algae and Filtering

In the process of filtering aquarium water, the challenge has been how to grow algae easily so the algae can be removed or harvested, thus removing nutrients from the water. If the algae are not removed, they will simply grow too thick, die, and put the nutrients back into the water.

Algae fall into two main categories: unicellular and multicellular. Uni-cellular algae are microscopic organisms which drift freely in the water (e.g. plankton) and give the water a usually green tint. Thus, uni-cellular algae are usually called "micro" algae or "phyto" plankton.

Multi-cellular algae are seaweeds that usually attach themselves to a surface. Since multi-cellular seaweeds are much larger than microalgae, they are usually called "macro" algae. It is these multi-cellular attached macroalgae seaweeds that are the focus of several of the embodiments of the upflow algae scrubbers described herein.

In freshwater aquariums, as the aquariums become larger and more complex, the filtering devices typically produce less air bubbles in the water; more effort is being placed on keeping air bubbles out of the water. Bubble aerators are thus used mostly in small freshwater aquariums.

In saltwater aquariums, bubble aerators are not used at all because the bubbles irritate corals and fish, and because the bubbles cause "salt spray" at the surface which covers nearby objects with salt and can short circuit electrical components. Additionally, air bubbles kill sponge-corals on contact.

Upflow Algae Scrubbers

A newer design, for example that embodied in International Application No. PCT/US12/31714, filed Mar. 31, 2012, discloses an in-aquarium algae scrubber utilizing upflowing gas bubbles instead of a waterfall. This design does not require overhead placement; instead the unit is placed submerged in the aquarium or sump, and is termed an "upflow algae scrubber" (or UAS scrubber) because of the upflowing gas bubbles.

Although an upflow algae scrubber is conveniently placed submerged inside an aquarium or sump, it still requires illumination for the macroalgae to grow. This illumination needs to be very near to the macroalgal attachment material, and would normally require a waterproof illumination source to be located submerged in the aquarium or sump next to the algae scrubber unit. However a "hang-on-glass" embodiment allows the illumination source to be placed outside of the aquarium or sump, shining in, as long as the macroalgal attachment material and bubbling mechanism or means are positioned adjacent to this illumination source, but on the inside of the aquarium. The embodiments set forth below offer improved "hang-on-glass" algae scrubber embodiments which allow this type of scrubber to perform better.

Gas airlift bubblers are commonly used in phytoplankton (microalgae) cultivation tanks to circulate the culture in a rotating/rolling fashion and to provide aerating bubbles throughout the entire tank. However when such gas airlift bubblers are used to supply gas bubbles to an upflow algae scrubber inside of an aquarium or sump, the entire water volume of the aquarium or sump tends to be circulated in a rotating/rolling fashion, and gas bubbles tend to permeate the water. Thus there is a need for an upflow algae scrubber embodiment which contains the gas bubbles and which prevents the entire aquarium or sump water volume from rotating/rolling.

Hang-on-glass UAS scrubber embodiments, such as those described herein, place the illumination source on the outside of the aquarium glass and thus may require illumination ventilation holes which allow illumination or heat to escape into the surrounding area undesirably, or it might be desired to utilize the heat from the illumination source to heat the aquarium water, such that no separate aquarium heater is needed. There is thus a need for an upflow algae scrubber embodiment that transports heat from the illumination source into the aquarium water.

The dwell-time of water within an upflow algae scrubber can help to lower the nutrients in the water directly adjacent to the macroalgal attachment material, because the same water will remain touching the attachment material and algal growth thereon longer and many more times before exiting the scrubber. However upflow algae scrubbers to date have been open structures, which allow the water to exit immediately without being contained. Thus there is a need to be able to keep the water in contact with the macroalgal attachment material longer.

Macroalgal growth on the macroalgal attachment material should generally be kept less than 20 mm in thickness in order to reduce self-shading of the algal roots, however upflow algae scrubbers to date have not provided a way to accomplish this. Thus, there is a need to be able to restrict the algal growth to 20 mm.

Gas bubbles which rise along the macroalgal attachment material sometimes route themselves around the sides of the material, thus avoiding the material and causing reduced filtering. Thus, there is a need to be able to restrain the gas bubble flow from routing around the sides of the macroalgal attachment material.

Lastly, upflow algae scrubbers enable algal growth on macroalgal attachment materials by flowing gas bubbles upwards along the materials. The various devices which have been used to generate these bubbles, however, sometimes generate algal growth on themselves, thus requiring the removal of the algae from themselves so that they can continue to supply gas bubbles. Many gas bubbler devices (such as airstones), however, are rough porous materials which are difficult to clean without clogging. Thus, there is a need for a gas bubbler which can supply gas bubbles to an upflow algae scrubber while remaining substantially algae-free itself, or allow easy cleaning of itself when needed.

Despite research that has discouraged growing solid attached macroalgae in the proximity of gas bubbles, allowing gas bubbles to flow rapidly in an "airlift" fashion along a rough surface (e.g. a screen) promotes the growth of solidly attached macroalgae that rapidly consume virtually all pertinent nutrients from the water. Moreover, rapid bubble flow and large bubble size do not impinge on macroalgal growth in the filter. Namely, the larger and more rapid the gas bubble flow, the more the algal strands are moved about, thus allowing more water and light to penetrate within the strands. Also, the large gas bubbles deliver a "wet, dry, wet, dry" action to the algae due to the insides of the gas bubbles being dry; this dry gas delivers more CO2 to the algae for better growth. The bubbles from an upflow algae scrubber can be eliminated with the assistance of bubble-remover attachments after the bubbles have traversed the algal growth in the scrubber, such that the bubbles do not interfere with other aspects of the aquarium. The following disclosures discuss such bubble-remover embodiments.

The embodiments of the invention encompass a range of different bubble removers. Bubbles can be removed by certain embodiments and the rapid circulation throughout the entire aquarium can also be reduced or stopped. Some culturing operations such as phytoplankton (planktonic microalgal) culturing reactors rely on airlift columns of bubbles to generate turbulence within reactor structures to keep the planktonic culture particles in suspension so they will grow a proper thick green mixture without settling on the bottom or forming a light-blocking surface at the surface. However, such whole-tank circulations, especially when mixed with gas bubbles, are often not desired in standard non-culturing aquariums, such as seahorse or guppy tanks And bubbles in general, as mentioned previously, are not desired at all in reef aquariums.

Not only are certain embodiments of the present invention capable of stopping bubbles and rapid circulation throughout the entire aquarium, but these embodiments can adjustably be set to do more or less of this, simply by adjusting of the height of the gas exit relative to the water surface; submerging the gas exit further below the surface would create more circulation and bubbles throughout the main aquarium, whereas raising the gas exit would reduce or eliminate them. This allows a single embodiment to be used in multiple applications.

Another property of some embodiments of the invention is the effect of the dwell-time of the water within the scrubber housing; the small inlets and outlets of the bubble remover housing restrict flow-through of the aquarium water, and thus it was thought that this would restrict effectiveness since the aquarium water was not being circulated past the macroalgal attachment material enough. However, many aquarium applications have high nutrient values in the water which normally cause a darker growth on the macroalgal attachment material (darker growth is not as effective as green growth, because the dark growth blocks illumination from reaching the "roots" of the algae and causes them to die and let go). The reduced flow-though (e.g., increased dwell-time) of the water inside the scrubber housing caused the water to make contact and re-contact with the growing algae there many times before exiting, and this brought the nutrient levels down farther in this internal water compared to the external water in the main aquarium. Thus greener (and better filtering) macroalgal growth was achievable sooner, compared to if higher nutrient water were allowed to flow unimpeded through the housing.

This dwell time functionality can also be adjusted by the user, via water inlet or outlet ports which are adjustable in size, or by adding or removing these ports. This might be accomplished by sliding or rotating port doors, or flaps. This adjustability can increase the speed of growth on new macroalgal attachment material which sometimes needs either more or less nutrients in order to begin growth properly, compared to after growth has developed and nutrients have been lowered in the water.

A useful aspect of placing the macroalgal attachment surface in one side of the bubble remover housing (the side which faces the aquarium glass) is that it created rapid circular water flow inside of the bubble remover housing, enabling a single opening at the bottom of the bubble remover to act as both the water inlet and the water outlet, As noted above, it does so without adding turbulence to the rest of the aquarium. Since the bubbling mechanism or means, with uprising gas bubbles, needs to be located on the side of the bubble remover housing that is adjacent to the aquarium glass (the location of the macroalgal attachment material), this upward flowing area naturally creates a downward flowing area on the opposite side of the bubble remover housing. This circular internal flow delivers enough water to and from a single water inlet at the bottom of the bubble remover housing that a second opening used as a water outlet is not required as long as the single water inlet is large enough. This single inlet/outlet opening requires less material to construct, less area to protect with livestock-screen, and allows for an open-bottom option. As long as the single opening is large enough in relation to the size of the macroalgal attachment material, and as long as the single opening is positioned to allow water entry and exit at the same time, the opening will perform the needed functions. For example, a macroalgal attachment material of width 20 cm and height 30 cm might need a single water inlet/outlet opening of width 20 cm and height 5 cm, positioned at, on, or near the bottom of the bubble remover housing.

Another benefit of the bubble remover housing is the proximal placement of the macroalgal attachment material to the illumination source. If the macroalgal attachment material were instead placed in the center of the aquarium or sump, or possibly near an opaque wall instead of a transparent wall, the illumination would have to be delivered to the macroalgal attachment material through an elongated pathway from the outside of the aquarium, or, the illumination source would need to be waterproofed and submerged so as to be adjacent to the macroalgal attachment material. However, since the bubble remover housing conveniently places the macroalgal attachment material directly adjacent to the aquarium glass, it enables the recommended 20 mm maximum distance to be utilized from the glass to macroalgal attachment material. Other distances from the macroalgal attachment material to the aquarium glass may also be used, and these distances may be adjustable via inserting the macroalgal attachment material into slots of differing distance from the glass. Larger distances may be desired, for example, when livestock are allowed to feed on the growth on the macroalgal attachment material.

The lighting for an upflow algae scrubber can be supplied by natural or artificial sources. Natural lighting would include "redirected" light from the sun via mirrors, metal conduits or fiber optics, whereas artificial lighting would include all manner of electric bulbs, light emitting diodes (LEDs), or other light-emitting devices, whether the devices are attached to the unit or are part of a separate device which illuminated the scrubber via proximity. In particular, the present embodiments makes use of the ability to place a directed beam of light immediately outside of a transparent aquarium wall, and have it illuminate the macroalgal attachment material of the UAS immediately inside of the transparent wall. And in order to increase the illumination of the macroalgae, reflective material may be added to various inside parts of the UAS housing. The benefits of keeping the illumination on the outside of the aquarium are safety and simplicity; the illumination device is kept dry, and does not need waterproofing. Thus any already-available source of illumination can be used so long as it is sufficient to grow the proper algae in the UAS.

It was assumed that when an enclosed illumination source such as light emitting diodes (LEDs) was placed on the aquarium glass without a ventilation or cooling mechanism, heat would build up inside the illumination housing; this might require an external heat sink (e.g., with "fins") to dissipate the heat into the air surrounding the aquarium. However, embodiments without a heat sink can function such that after overnight operation the LEDs does not overheat. The aquarium water can be relied upon to absorb enough heat from the LEDs to keep the LEDs within proper operating temperature even though no part of the LEDs is touching the water. The heat from the LEDs is absorbed by the aquarium glass or acrylic, which then is absorbed by the aquarium water, enough to keep the LEDs from overheating. Expanding on this, by increasing the heat radiation contact surface area, and adding a heat receiving surface in the water, enables much larger LEDs (as well as fluorescent bulbs) to be used.

Illumination sources tend to generate heat; some UAS installations may be in warmer climates where the temperature of the room where the aquarium is installed is warm, and extra heat from the UAS illumination source would not be welcomed. Other installations might be in cooler climates, where heaters are normally needed to keep the aquarium temperature warm enough. In either case, transferring heat from the UAS illumination source to the aquarium water might be desired, and the present invention embodiments provide the ability to do this.

The solid attached macroalgae that grow on the UAS growth surface must be removed (harvested) in order for the nutrients to be removed from the aquarium water. This is accomplished by removing the growth surface from the UAS (or removing the whole UAS), and scraping the algae off. The growth surface is then replaced back into the UAS (or the whole UAS is replaced back into the aquarium) for more growth to occur. Since the illumination source stays on the outside of the aquarium, and since the heat sinks stay on the inside of the aquarium and do not need to be removed, the removal of the macroalgal growth surface and cover is simplified In aquariums with herbivorous livestock, there is the possibility of automatically feeding the livestock with the algae growth. This is achieved by just allowing the algae to grow more, and thus letting the algae flow out of UAS housing and into the aquarium (or, allowing the livestock to enter the UAS housing). Any of the types of green hairy algae will eventually grow or let go into the main livestock area, and will thus be available for eating by herbivores. In the present invention, some embodiments will allow the macroalgae to grow up the macroalgal attachment material and then flow down the water return compartment (following the water current); the algae will then exit the bottom of the UAS housing where the algae can be eaten. However, if livestock are allowed to enter the UAS housing, the algal growth would be consumed much sooner. Other embodiments will allow the gas outlet of the UAS housing to be positioned (or adjusted to be located) below the aquarium water surface, and thus gas bubbles and algal growth will exit the gas outlet of the UAS housing together, where the algal growth can be consumed by the livestock.

FIG. 1 is a diagram that shows a UAS equipped aquarium or sump 100 with an Upflow Algae Scrubber (UAS) "hang-on-glass" embodiment. In this embodiment, illumination for the algal growth is provided by an illumination mechanism or means 104 on the outside of an aquarium wall 108, shining in through the transparent aquarium wall; the top of the UAS housing 102 rises above the aquarium water surface in order to vent the gas from the bubbles that have popped at the water surface inside the UAS housing that are generated by a bubbling apparatus (not pictured). One or more magnets 106 on the outside of the aquarium wall 108 couples to one or more magnets attached to the UAS housing to hold the UAS in place. In other embodiments, the UAS is attached to the aquarium wall by hooks, or other interlocking structures. The UAS housing can have either opaque or transparent walls. The UAS can have any size or dimensions commensurate with the aquarium or sump 100 in which it is to be utilized.

Figure 2:
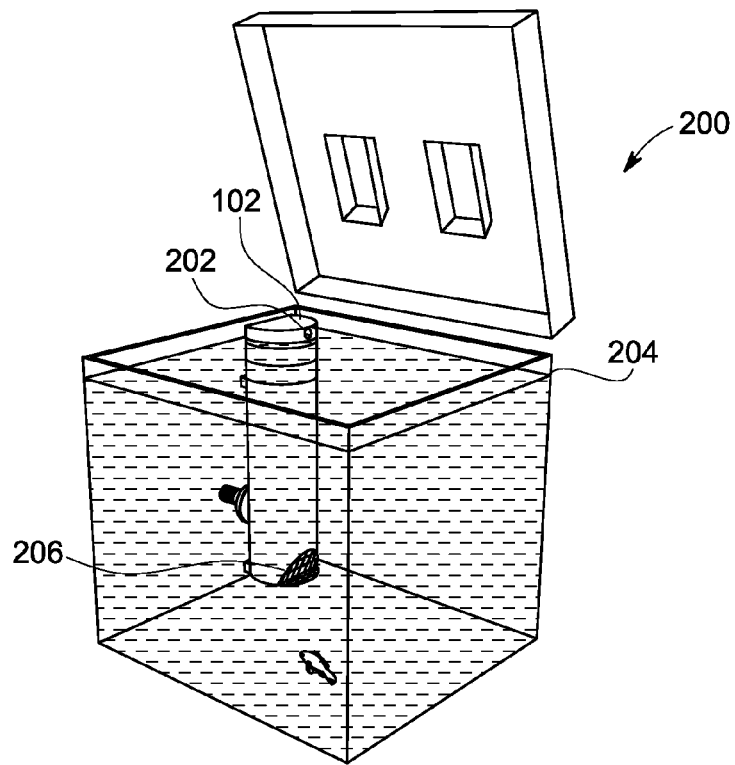
FIG. 2 is another perspective view of the aquarium of FIG. 1 with the UAS embodiment.

FIG. 2 shows another view of the UAS equipped aquarium embodiment of FIG. 1. At the bottom of the UAS housing can be seen the water inlet 206, which in this embodiment also functions as the water outlet due to the rapid circular flow inside the UAS housing. Also, there can be seen the gas outlet vent 202 on the side of housing lid 102, which is kept above the water surface 204 so as to release the gas from exploded gas bubbles into the atmosphere. Alternately, if bubble removal were not desired, housing lid 102 with gas outlet vent 202 could be placed below the water surface 204. The water inlet 206 and gas outlet vent 202 can have a shape, size or dimension commensurate with the size of the UAS and the aquarium or sump 200 in which the UAS operates. The relative size of each opening can also be selected to regulate water and airflow through the UAS.

Figure 3:
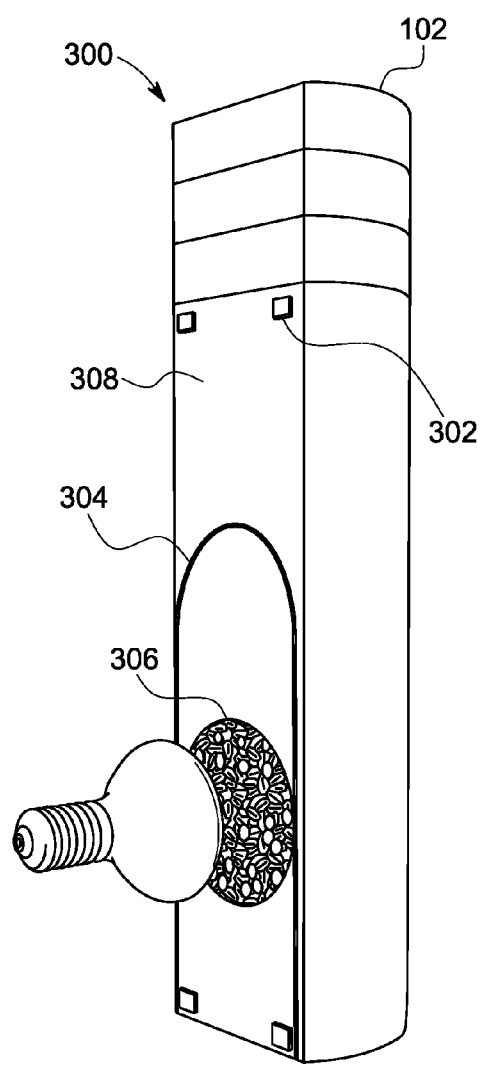
FIG. 3 shows front elevational view of the UAS scrubber of FIG. 1.

FIG. 3 shows a close up of the side of the UAS embodiment of FIG. 1. This embodiment mounts on the aquarium glass, hence the name "hang on glass." In this figure can be seen the docking mechanism or means 308, which is a flat surface in this embodiment so as to complement the surface of the flat aquarium glass. However, the docking surface could also be curved to match rounded, bow front, or circular aquariums, or it could have two flat surfaces (e.g., connected 90 degrees) so as to match a corner wall in an aquarium. The magnets 302 which are visible here couple to the magnets which are external to the aquarium glass, however any type of coupling mechanism or means (such as suction cups, hooks, hook-and-loop fastener tape, friction fit) could be used, including none at all. When using no coupling mechanism or means, the UAS housing can be set on the aquarium bottom, possibly utilizing added weights to keep the housing from floating. Illumination port 306 can be shaped to complement the shape of the illumination mechanism or means, in this embodiment a round compact fluorescent bulb (CFL) is shown. However illumination port 306 could be any desired shape such that sufficient illumination is allowed to project into the UAS housing to grow sufficient algae on the macroalgal attachment material. By making illumination port 306 the approximate shape of the illumination source, the amount of illumination escaping from the UAS housing will be minimized, which will thus maximize the amount of illumination available for macroalgal growth.

Housing lid 102 is shown on top of two removable height adjusting segments. Sealing mechanism or means 304 aligns and seals to the aquarium glass wall, containing gas bubbles that may otherwise escape out of illumination port 306. Sealing mechanism or means 304 can be any non-corrosive flexible material suitable for containing gas bubbles, such as rubber, silicone or other soft polymer, and can be coupled to the UAS housing or may instead be coupled to the aquarium or sump wall.

Figure 4:
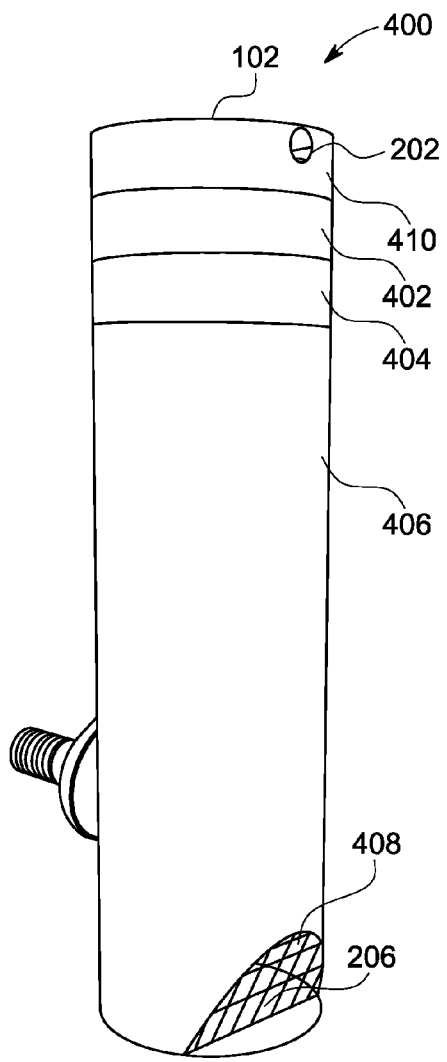
FIG. 4 shows a side elevational view of the UAS scrubber of FIG. 1.

FIG. 4 shows the other side of the UAS embodiment of FIG. 1. The flat bottom of housing 406 can be seen clearly here below the screening mechanism or means 408; this type of flat bottom UAS embodiment could be set directly on the bottom of the aquarium, possibly using weights to keep it in position. The top most portion of the UAS shows the removable lid 102 with a gas outlet vent 202. This gas outlet vent may be placed above the aquarium water surface so that gas escapes into the atmosphere. Alternately, if bubble removal is not required, the housing lid 102 may be below the aquarium water surface level; in such case gas bubbles will emit from gas vent outlet 202 into the aquarium water. In such a submerged application, housing lid 102 can employ an attachment mechanism or means to hold to the housing 406 to keep the lid from floating, and also a hose or tubing could be attached to gas vent outlet 202 to route the gas above the aquarium water surface.

Housing lid 102 can be removed to enable access to the macroalgal attachment material and gas bubbling mechanism or means for cleaning. Also, while the lid 102 and macroalgal attachment material are removed, the aquarium glass can be cleaned with a brush. Below the lid 102 is housing height adjustment mechanism or means 402 and 404; in this embodiment the housing height adjustment mechanisms or means 402 and 404 are removable housing segments. These segments can be removed or added according to how high the aquarium water surface is; there can be as many height extensions 402 and 404 as needed, or none at all, and the extensions can be made of the same or different material as the housing 406 or lid 102. In another embodiment, the height adjustment mechanism or means is placed below housing 406, and in yet another embodiment the adjustment mechanism or means is both below and above the housing 406. Alternate methods of height adjustment can include a flexible accordion material, or a sliding apparatus that moves up and down similar to a periscope of a submarine. In the case of an accordion or sliding apparatus, no height adjusting segments 402 or 404 need be removed; instead the lid 102 is simply positioned at the desire height, and is held in that position by detents, friction, pins, non-corrosive adjustable screws, or a combination of these, or any other method suitable for keeping lid 102 in a position placed by the user.

Below the housing height adjustment mechanism or means 402 and 404 is housing 406, which is coupled internally to the macroalgal attachment surface, gas bubbling mechanism or means, and optionally to an illumination attenuation mechanism or means. At the bottom of housing 406 can be seen the water inlet/outlet 206, and the optional water inlet screening mechanism or means 408 which in the current embodiment can be a screen, mesh, grating, or other suitable material to keep herbivorous livestock and/or other foreign matter out of the UAS housing 406. Housing 406 can be plastic, fiberglass, glass, acrylic, or any other non corrosive material. Housing height extensions 402 and 402 can couple to housing 406 by drop-in fit with an internal lip, or may use an attachment mechanism such as friction, hook-and-pin, or detents. As many or as few housing height adjustment sections 402 and 404 may be used, including none at all.

Figure 5:
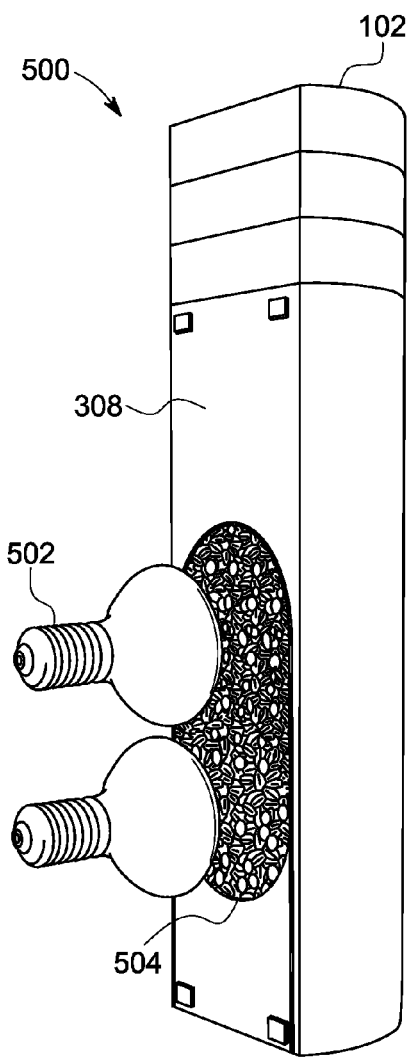
FIG. 5 shows front elevational view of a UAS scrubber according to one embodiment of this invention.

FIG. 5 shows a UAS embodiment 500 with an enlarged illumination port 504 and an additional CFL bulb 502. The illumination port 504 has been enlarged to enable the illumination of both CFL bulbs to project into the UAS housing, however additional discrete illumination ports could have been added instead. The enlarged illumination port 504 could be any shape which enables sufficient illumination to enter the UAS housing in order to grow sufficient algal growth on the macroalgal attachment material. Illumination mechanism or means 502 can also be light emitting diodes (LEDs), such as the 660 nanometer color red, in which case the illumination port 504 can be shaped to enable the illumination from the LEDs to reach the macroalgal attachment material, while blocking a substantial portion of this illumination from escaping out of illumination port 504.

The illumination mechanism or means 502 can also be linear fluorescent bulbs, in which case the illumination port 504 could be a long narrow opening. An embodiment of the invention could also be configured to accommodate remote illumination that was "piped in," or redirected light, such as sunlight routed through fiber optics, reflective conduits, or mirrors. In such a case the illumination port 504 could be shaped to complement the fiber optic cable, conduit or mirrors. The size and/or shape of the illumination port 504 could also be adjustable by the user, which would allow a variety of illumination sources to be used. One methods and mechanisms of adjustability can include a docking mechanism or means 308 comprised of two overlapping sliding plates, each plate with an illumination port 504, such that the two plates could slide across each other, thereby varying the overlap of each illumination port 504 so as to enlarge or decrease the overall port size. Alternately, a removable cover could be placed into or removed from illumination port 504 so as to block a portion of illumination port 504, yet leave the remainder of the port open.

Figure 6:
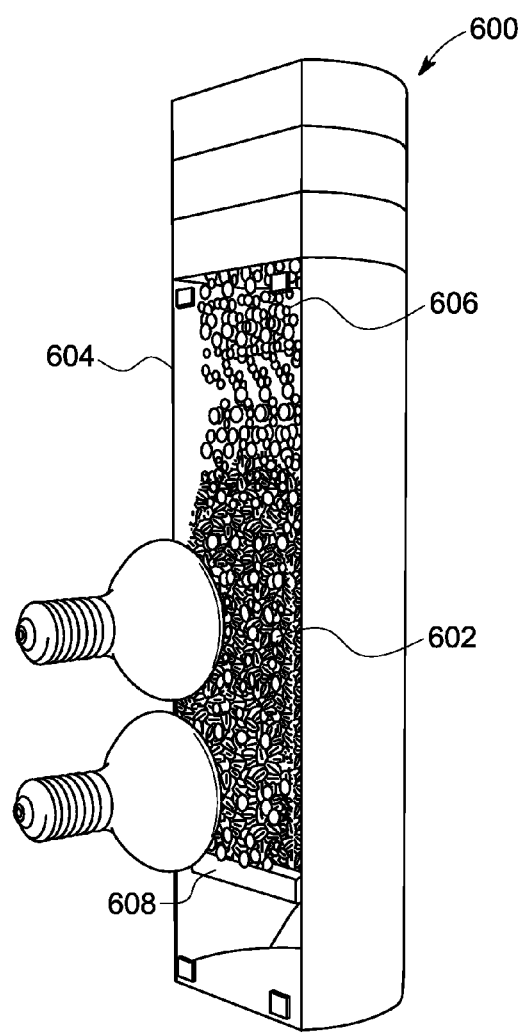
FIG. 6 is a front elevational view of a UAS scrubber with a translucent/transparent docking mechanism or means, according to another embodiment of this invention.

FIG. 6 shows an embodiment of a hang-on-glass UAS with bubble remover 600, with a transparent/translucent docking mechanism or means 604, which in this embodiment is also the illumination port. This embodiment allows for the gas sealing of the docking mechanism or means 604 to the UAS housing, thus making the entire docking mechanism or means 604 an illumination port which requires no sealing mechanism or means to seal bubbles from escaping the UAS housing. Through the transparent/translucent docking mechanism or means 604 can be seen the first bubbling mechanism or means 608, the attached macroalgal growth 602, and the gas bubbles 606. In another embodiment, a docking mechanism or means 604 can be included that is a combination of transparent/translucent and opaque surfaces, for example, such that the transparent/translucent portion complemented the shape of the illumination mechanism or means, and the opaque portion blocked illumination from escaping the UAS housing.

Figure 7:
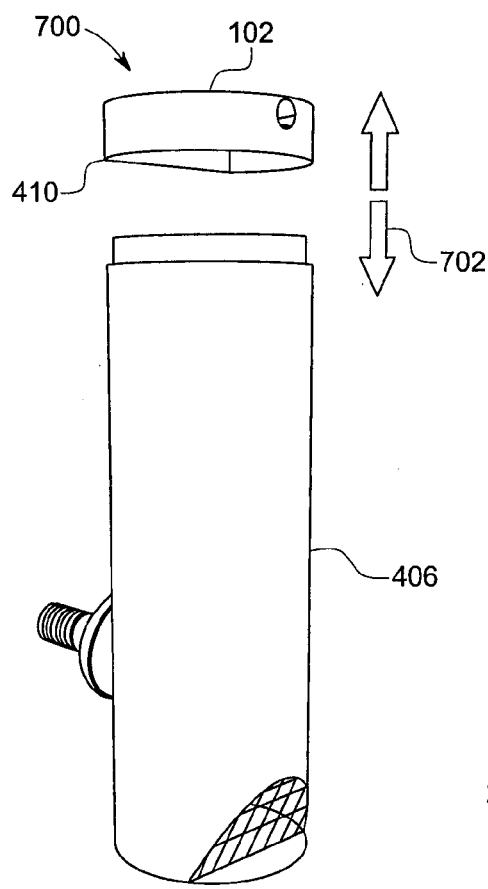
FIG. 7 is a side elevational view of the UAS scrubber shown in FIG. 1, showing the height adjustment mechanism or means.

FIG. 7 shows a UAS embodiment 700 where the two height adjustment segments have been removed. The housing lid 102 is shown in an elevated position; when the lid 102 is lowered down in the direction of arrow 702 to set on the housing 406, the overall height will be reduced but with the same functionality, thus allowing the UAS 700 to operate with smaller aquariums. Housing 406 can be any shape and size that contains the gas/water mixture inside housing 406, until the mixture reaches the water surface inside the housing 406, at which point the gas bubbles explode and substantially only water returns downward to the water inlet/outlet at the bottom of housing 406. Other housing 406 shapes might be square, rectangular, hexagonal or irregular, and the housing 406 might be angled so that uprising gas bubbles flow at angles instead of straight up. Such an angled housing 406 might be useful where the bottom of the UAS could only fit in one part of the aquarium, but the top of the UAS could only rise above the aquarium water surface in a different part of the aquarium, for example, around a lip or ridge of the top of the aquarium or sump.

Figure 8:
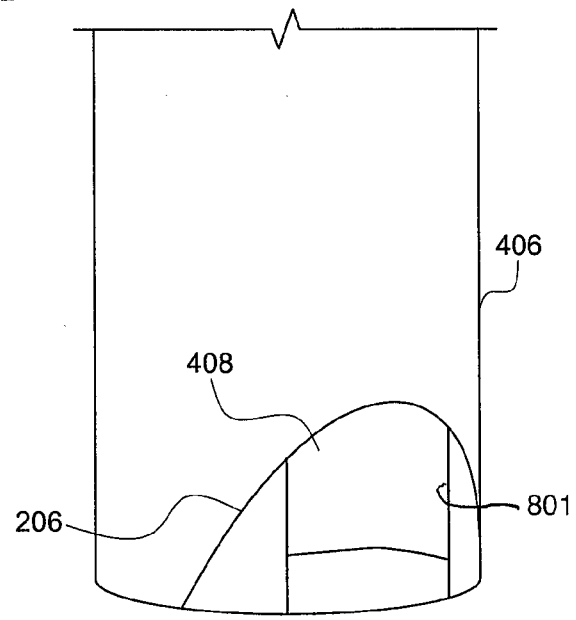
FIG. 8 shows a lower rear perspective view of the livestock screening mechanism or means of the UAS scrubber of FIG. 1.

FIG. 8 shows the bottom of a UAS embodiment where the combined water inlet/outlet 206 at the bottom of the housing 406 is covered by an optional screening mechanism or means 408. The screening mechanism or means prevents livestock and other foreign matter from entering the UAS housing 406, and also prevents loose macroalgae that may have detached from the macroalgal attachment material from entering the main aquarium or sump area where pumps might be clogged. The screening mechanism or means 408 can have any dimensions sufficient to partially or completely prevent access to livestock. The screening mechanism or means 408 can define openings of any size or shape and can function to restrict waterflow, algae migration and livestock migration.

The water inlet 206 in this embodiment is a single opening, which also provides for the water outlet, due to the rapid circular movement of water inside the housing 406 via the internally rising gas bubbles on the illumination side of the housing 406. However, in a different embodiment a separate water outlet is utilized along the middle portion of housing 406, and a screening mechanism or means is placed over it too. Water inlet/outlet 206 can be any shape such that it enables sufficient water flow into and out of housing 406. For example, when the UAS is placed in an aquarium with rocks or wood decorations, water inlet/outlet 206 could be shaped to appear like part of the rocks or wood. In yet another embodiment, a separate water inlet could be placed in a different location on the housing 406 than the water outlet. For example, one embodiment has a single water inlet 206 at the bottom of the housing 406, but has several small water outlets (not shown) along the sides of housing 406. Such small water outlets are not large enough to allow livestock in; yet because there are several of these holes, they combine together to allow enough water to exit housing 406, while at the same time substantially not allowing gas bubbles to exit.

In one embodiment, an adjustable water inlet or outlet port 801 is provided defining a user-positionable port cover. This adjustable port 801 can have any opening and closing mechanism, including sliding doors, hinged doors, rotating cover, or similar adjustable mechanism. The adjustable port can be coupled to the UAS by any coupling mechanism or means to secure the user-positionable port cover to the adjustable water inlet or outlet port such that the user can move the port cover from a first position to a second position, where the second position provides a larger port opening and thus allows more water flow into or out of the containment means 406 in order to reduce dwell time. The first position, to the contrary, restricts the port opening and limits the water flow and increases dwell time.

Figure 9:
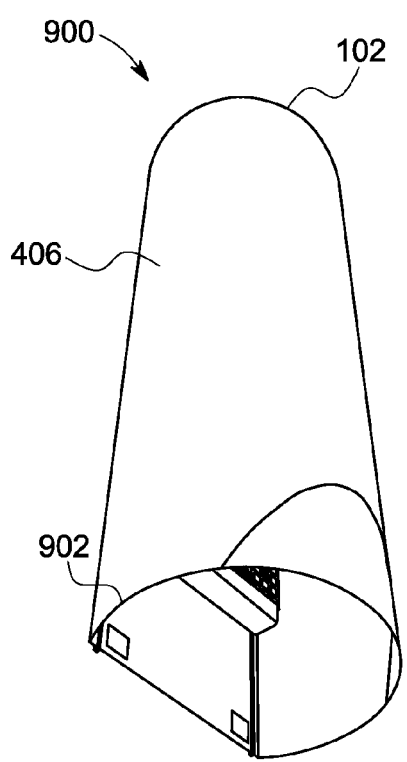
FIG. 9 shows a bottom perspective view of an embodiment of a UAS scrubber with a single water inlet/outlet, according to another embodiment of this invention.

FIG. 9 shows the bottom of a UAS embodiment 900 which has an open bottom 902 instead of a closed one, and where the side-opening of FIG. 8 is closed. This open bottom 902 of the housing 406 thus becomes a combined water inlet/outlet and is useful for when the UAS bottom 902 is mounted higher than the bottom of the aquarium, thus leaving the bottom of the UAS housing 406 open for water flow. Due to the rapid circulating water inside of the housing 406, water will be delivered to and from the housing bottom opening 902. In another embodiment, the insides of housing 406 are coated with a reflective material, so as to increase the illumination that reaches the macroalgal attachment material. The open bottom 902 could also be protected with a screening mechanism or means.

Figure 10:
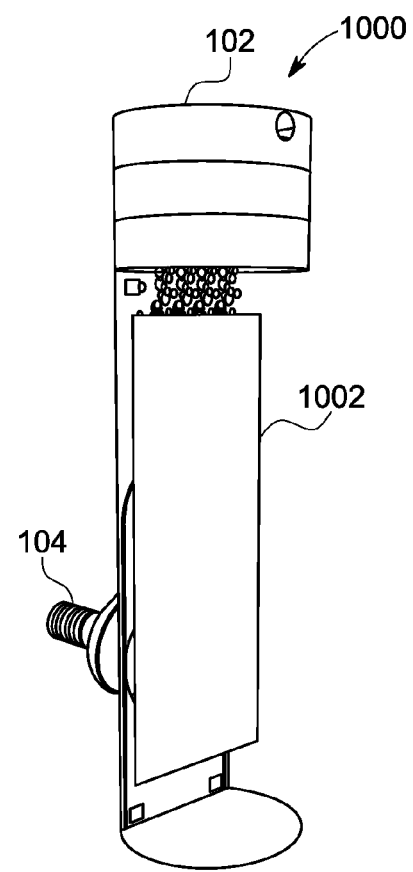
FIG. 10 shows a cutaway side perspective view of an embodiment of a UAS scrubber with an illumination attenuator, according to another embodiment of this invention.

FIG. 10 shows a UAS embodiment 1000 with the housing removed to show the illumination attenuation mechanism or means 1002. Illumination attenuation mechanism or means 1002 can be an opaque wall which sits between the illumination port and the water inlet/outlet. The illumination attenuation mechanism or means 1002 prevents a straight line-of-light pathway of light through the housing, so bright light does not exit the water inlet or outlet and enter the main aquarium or sump area, which would contribute to nuisance algal growth in these areas.

The illumination attenuator mechanism or means 1002 is positioned such that light from the illumination mechanism or means 104 must route around the illumination attenuation mechanism or means 1002 in order to exit the water inlet (or water outlet if supplied). In the case of an open-bottom UAS embodiment such as FIG. 9, the illumination attenuation mechanism or means 1002 would be positioned so as to block direct line-of-sight illumination from traveling from the illumination mechanism or means 104 to the open housing bottom. The illumination attenuation mechanism or means 1002 could be any opaque surface, whether flat or curved, with or without corners, and of any thickness, such that a substantial amount of illumination from illumination mechanism or means 104 were prevented from exiting the water inlet or outlet. Illumination attenuation mechanism or means 1002 could be plastic, fiberglass, acrylic, or any other non corrosive aquarium safe material which blocks a substantial amount of illumination. Alternatively, illumination attenuation mechanism or means 1002 could be translucent/transparent and covered with a layer of illumination blocking material.

Illumination attenuation mechanism or means 1002 can be coupled to the UAS housing permanently, as one unified entity, or illumination attenuation mechanism or means 1002 can be releasably coupled to the UAS housing by means of friction, clips, detents, slots, non-corrosive screws, or a combination of these, or any other non-corrosive method that positions and holds illumination attenuation mechanism or means 1002.

If illumination attenuation mechanism or means 1002 is coupled on its sides to the UAS housing (not shown), the gas bubbles will be forced to traverse up the macroalgal attachment material (not shown) instead of bypassing the macroalgal attachment material on the sides. This become more important as the algal growth on the macroalgal attachment material becomes thick, because thick growth will route gas bubbles around the growth, thus depriving the growth (especially the algal strands deep within the growth) of nutrients to grow. It is thus preferred that the gas bubbles are substantially forced to travel through any thick algal growth on the macroalgal attachment material.

If the macroalgal attachment material has been positioned at most 20 mm from the aquarium glass (thus giving 20 mm maximum algal growth thickness), then the side couplings of the illumination attenuation mechanism or means 1002 to the UAS housing become critical in preventing gas bubble flow from routing around the growth. This is because algal growth on the macroalgal attachment material can quickly grow to 20 mm thickness and form a blockade to the uprising gas bubbles. In addition, the side couplings of illumination attenuation mechanism or means 1002 to the UAS housing will also prevent any illumination from routing around the sides of the illumination attenuation mechanism or means 1002, thus further reducing the amount of undesirable illumination exiting the UAS water inlet or outlet.

In addition, by properly shaping or angling of the bottom of illumination attenuation mechanism or means 1002, illumination can be also be blocked before it escapes the UAS housing, while at the same time, still allowing water to flow up the macroalgal attachment material without being blocked by illumination attenuation mechanism or means 1002. Such shaping or angling might include curving the bottom of illumination attenuation mechanism or means 1002 forward at its bottom, so that a smaller gap remained between illumination attenuation mechanism or means 1002 and the illumination port (not shown), or extending illumination attenuation mechanism or means 1002 downward so that a small gap remained between illumination attenuation mechanism or means 1002 and the bottom of the UAS housing. These gaps are termed the "illumination attenuator bottom gaps,", and generally keeping them about 1 cm will allow sufficient water to pass, but will block sufficient illumination. If no livestock screening mechanism or means is utilized, the illumination attenuator bottom gap can be reduced to a size to restrict the pertinent livestock from entering the macroalgal attachment material area.

Figure 11:
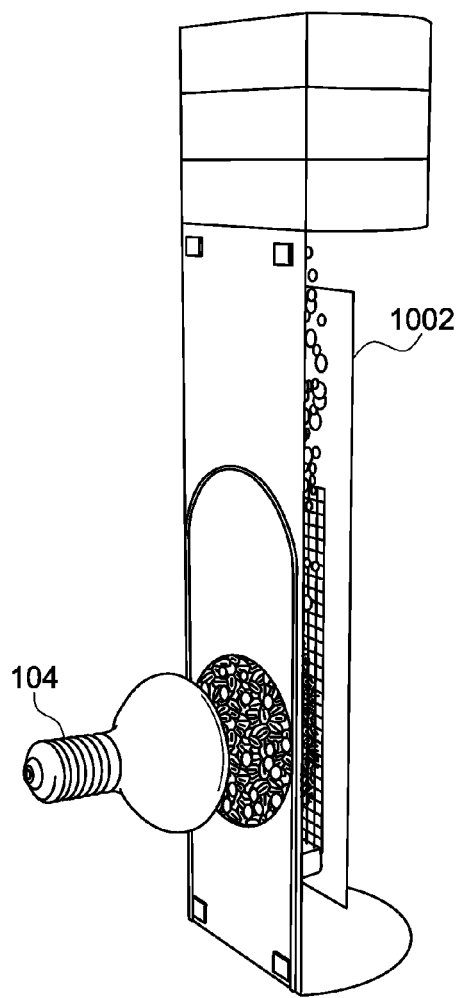
FIG. 11 shows another cutaway perspective view of the UAS scrubber embodiment of FIG. 10.

FIG. 11 shows another cut away view of the UAS embodiment of FIG. 10. Here it can more clearly be seen how the direct line-of-sight path of illumination from the illumination mechanism or means 104 to the water inlet/outlet (not shown) is blocked by the illumination attenuation mechanism or means 1002. This is especially true if the sides of illumination attenuation mechanism or means 1002 are coupled with no gaps to the UAS housing. In another embodiment, illumination attenuation means 1002 could extend all the way to the bottom of the UAS housing, but not be coupled to the sides of the UAS housing, thus allowing water to enter only from the sides. Or illumination attenuation mechanism or means 1002 could extend to (and possibly couple with) one side, or the other side, or both sides of the UAS housing as explained above, as long as water is allowed to travel from the water inlet to below the macroalgal attachment material. In yet another embodiment, the UAS could operate as shown in FIG. 11, without any UAS housing. Such operation would give open access to livestock, but would still contain much of gas bubbles.

Figure 12:
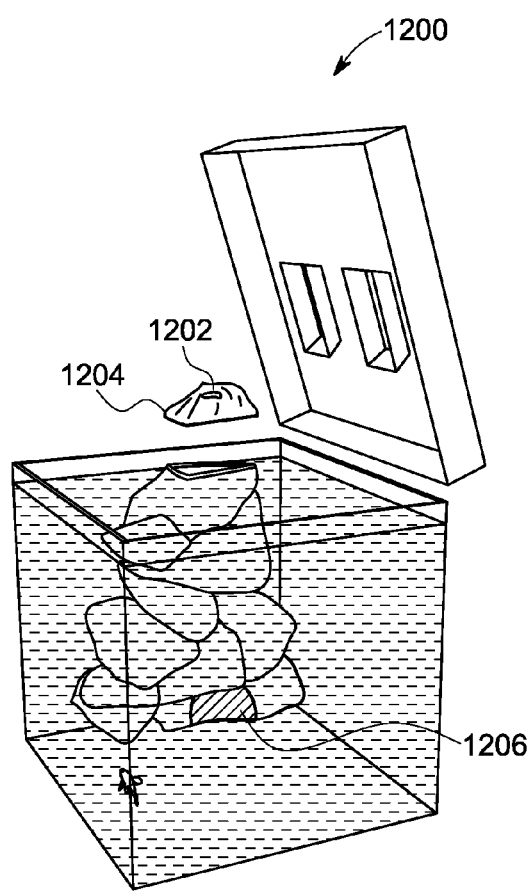
FIG. 12 shows an elevational perspective view of a decorative UAS scrubber embodiment placed in an aquarium, according to another embodiment of this invention.

FIG. 12 shows a decorative UAS hang-on-glass embodiment 1200 with bubble remover in an aquarium. The UAS housing lid 1204 is elevated to show how the macroalgal attachment material inside is accessed for cleaning. This embodiment does not show any housing height adjustment segments, however such segments could be included and decorated as well. The combined water inlet/outlet 1206 is shown at the bottom, however a separate inlet and outlet, or multiple inlets and outlets, could be positioned on the UAS housing. The gas outlet vent 1202 is cut out of the lid 1204 so as to look natural in the rock design. Not visible is the illumination attenuation mechanism or means, which in this embodiment would be positioned so as to block direct light from traveling from the illumination mechanism or means (also not shown) to the water inlet or outlet.

Figure 13:
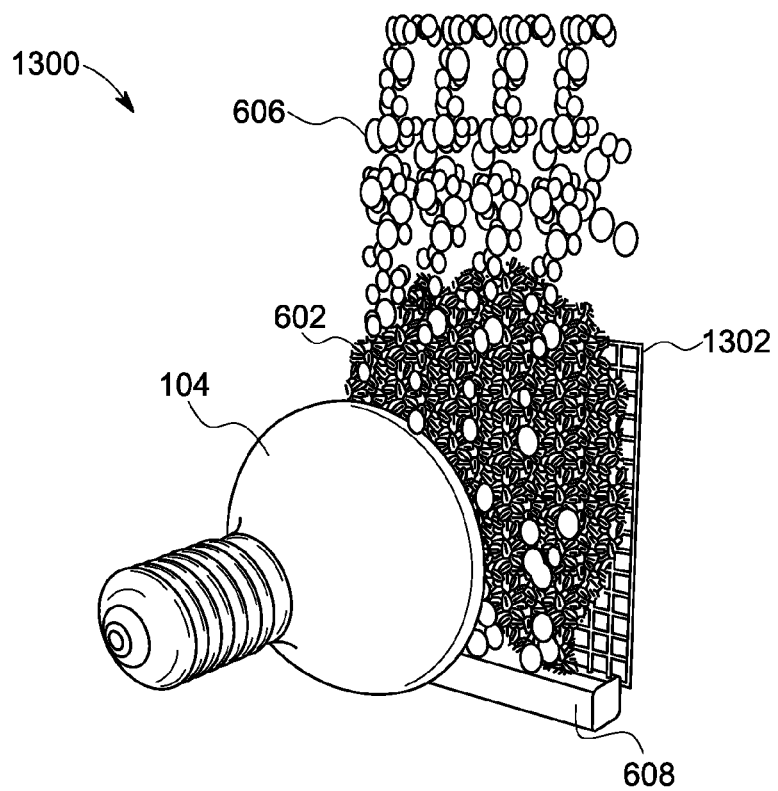
FIG. 13 shows a detailed view illustrating a macroalgal growth mechanism or means, according to one of the present embodiments.

FIG. 13 shows a closeup of the macroalgal growth mechanism or means 1300, which includes the first bubbling mechanism or means 608, first macroalgal attachment material 1302, attached macroalgal growth 602, illumination mechanism or means 104, and rising gas bubbles 606. As the gas bubbles 606 travel up and rub against the macroalgal attachment material 1302, the macroalgae 602 on the attachment material is exposed to alternating wet, dry, wet, dry cycles as each bubble passes by. This is due to the inside of each bubble being "dry" (filled with gas); this delivery of gas directly to the microscopic algal surfaces provides the extra carbon that the algae need to grow efficiently. The carbon that algae consume in aquariums is normally provided mostly by $CO_2$ that has dissolved into the water, but this dissolution is relatively slow, and rapidly growing algae 602 can consume carbon faster than $CO_2$ dissolution can occur. So the rising bubbles 606 rub directly against the attachment material 1302 (and attached algae), and $CO_2$ gas is delivered directly to the growing algae 602 during the "dry" portion of a passing bubble. When the bubble has passed, and the algae 602 enter the "wet" portion again, other needed nutrients are then extracted out of the water in order for the algae to grow. Bubbling mechanism or means 608 could be an airstone, or a tube with bubble ports or slots, or a "divided bubble plate" as described farther below.

Figure 14:
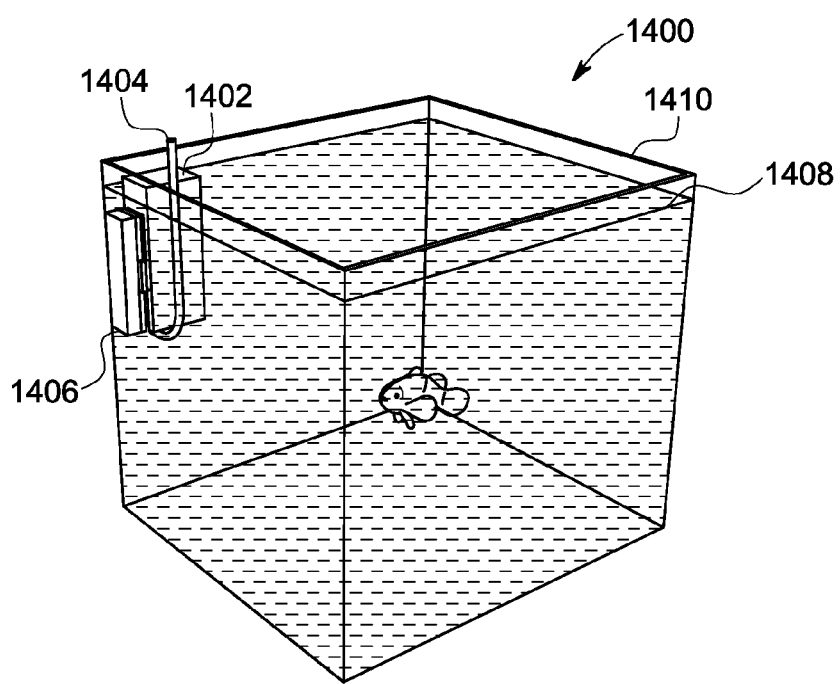
FIG. 14 shows a perspective view of a small aquarium with a small hang-on-glass UAS scrubber.

Another embodiment obtains the gas bubbles 606 from another source outside of the UAS, such as another aquarium component. The first macroalgal attachment material 1302 can be any surface which enables macroalgal attachment, such as cross-stitch plastic canvas which has been roughed up, or a molded network of prickly mesh, or "appendages" as described in co-pending U.S. provisional application 61/739, 703, filed on Dec. 19, 2012. The macroalgal attachment material 1302 is preferably a translucent/transparent material, or an opaque white, which enables more illumination to reach the "roots" of the macroalgae 602 thus preventing the roots from dying and detaching from the macroalgal attachment material 1302. First macroalgal attachment material 1302 and first bubbling mechanism or means 608 are releasably coupled to either the docking mechanism or means, housing, or the illumination attenuation mechanism or means, so as to allow the first macroalgal attachment material 1302 and first bubbling mechanism or means 608 to be removed for cleaning during periodic harvesting. Some coupling mechanisms or means suitable for this releasability are clips, slots, detents, weights, friction, or hooks, a combination of these, or any other method or structure which allows releasability by the user. If the first macroalgal attachment material 1302 and first bubbling mechanism or means 608 are coupled to the illumination attenuation mechanism or means, then they can all be removed together for cleaning FIG. 14 shows a small aquarium 1410 with a small hang-on-glass UAS embodiment with bubble remover. This UAS embodiment 1402 is designed to be removed entirely from the aquarium when the macroalgae need to be harvested. Air supply mechanism or means 1404 is connected to an air pump (not shown), and supplies the macroalgal growth mechanism or means with gas bubbles. Illumination mechanism or means 1406 couples to the outside of the aquarium and illuminates the macroalgal attachment mechanism or means through the aquarium wall. The top of the UAS 1402 is placed slightly above the aquarium water surface level 1408 so gas may vent to the atmosphere. This UAS embodiment is designed more for do-it-yourself construction and is built from commonly available rectangular plastic tubing, although it is envisioned that other shapes and sizes of materials can be suitably used instead.

Figure 15:
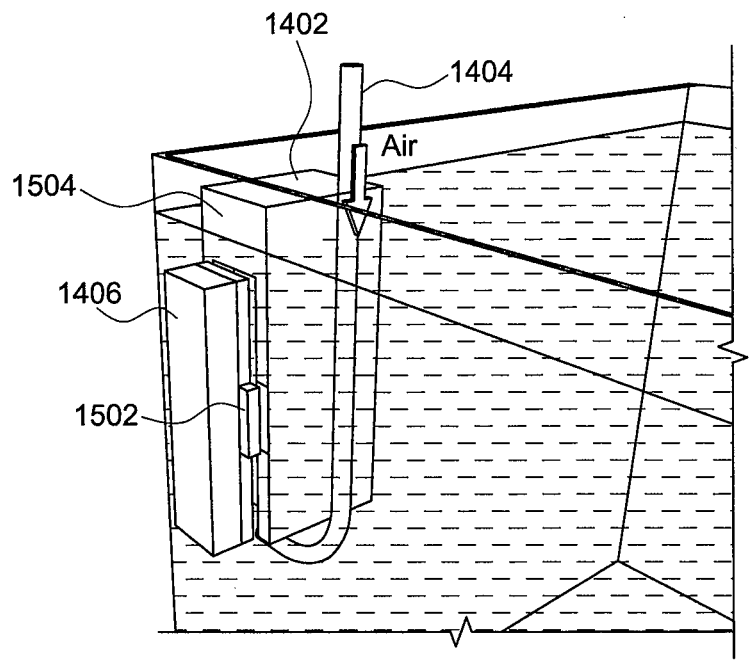
FIG. 15 shows a frontal perspective view of the small hang-on-glass UAS scrubber of FIG. 14.

FIG. 15 shows a closer view of the UAS embodiment 1402 of FIG. 14. Here can be seen the magnets 1502 which are attached to both the illumination mechanism or means 1406 and the UAS housing 1504. The magnets on housing 1504 couple through the aquarium glass to the magnets 1502 on the illumination mechanism or means, thus making the cleaning of the UAS just a matter of pulling the entire UAS 1402 away from the aquarium glass and removing it from the aquarium. Also visible is the gas/air supply tubing 1404 which is coupled to an air pump (not shown); the arrow shows the direction of gas/air flow.

Figure 16:
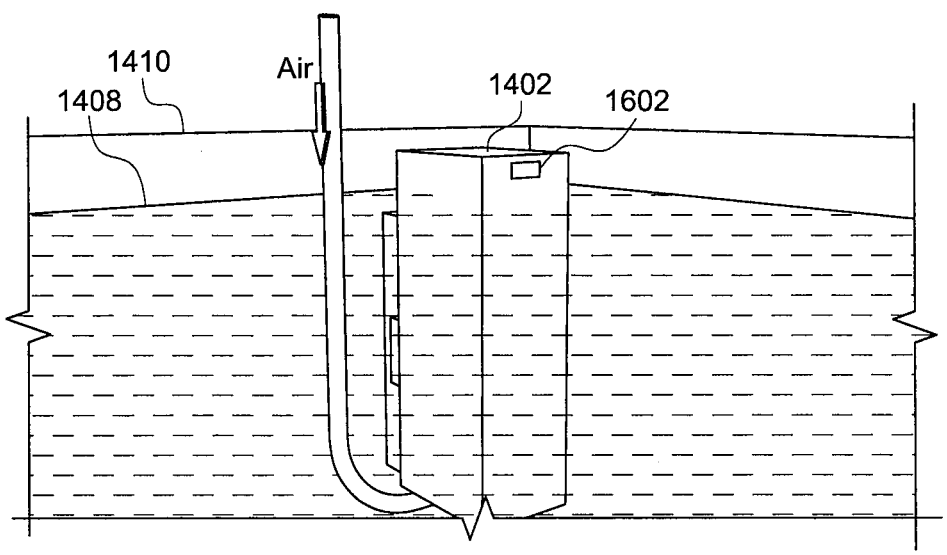
FIG. 16 shows a rear perspective view of the small hang-on-glass UAS scrubber of FIG. 14.

FIG. 16 shows a backside perspective view of the UAS embodiment of FIG. 14. The gas outlet vent 1602 is visible here, positioned just above the aquarium water surface 1408. Positioning of the gas outlet vent 1602 is accomplished by moving the entire UAS 1402 along the aquarium glass 1410 as needed. By keeping the gas outlet vent 1602 above the water surface, gas bubbles do not go from the vent 1602 into the water. And by keeping the top of the UAS 1402 low and near to the water surface 1408, the UAS 1402 does not interfere with any aquarium hood or other devices which might be overhead. If bubble removal is not desired, the entire UAS 1402 can be placed submerged below the aquarium water surface 1408, simply by sliding it downwards. Alternately, a hose or tubing could be attached to gas outlet vent 1602, when submerged, to route the gas above the aquarium water surface.

Figure 17:
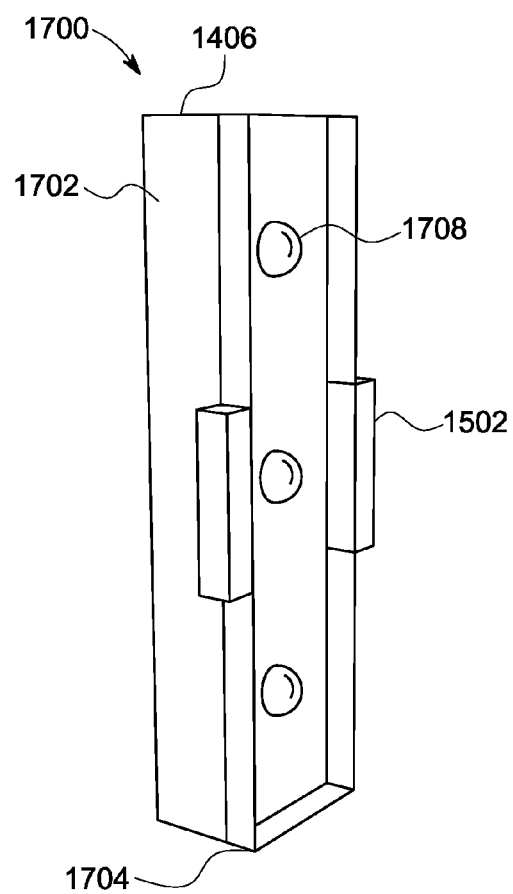
FIG. 17 shows a detailed perspective view illustrating a light-emitting-diode (LED) illumination mechanism or means for the UAS scrubber of FIG. 14, as per the embodiments of the present invention.

FIG. 17 shows a closeup 1700 of the illumination mechanism or means 1406, in this embodiment a light-emitting-diode (LED) module. In this embodiment, 660 nanometer (red) LEDs 1708 are used, for example 1 watt or 3 watts each, depending on the size of the aquarium and the filtering capacity needed. White LEDs 1708 could also be used if the user disliked the appearance of red light. The illumination-shield 1704 which surrounds the LEDs 1708 reduces the amount of illumination escaping to the sides, and helps direct more illumination through the aquarium glass to the macroalgal attachment material. LEDs 1708 are a good source of illumination for small embodiments such as this because of their small size and low voltage; however any type of illumination mechanism or means 1406 could be supplied including natural sunlight. Magnets 1502 provide coupling of the illumination housing 1702 to the magnets on the inside of the aquarium glass. Other embodiments envision different numbers of magnets, while still other embodiments use other attachment mechanism or means such as suction cups, hooks, hook-and-loop material, a shelf, or a blockade fit where another aquarium component keeps the UAS in place.

Figure 18:
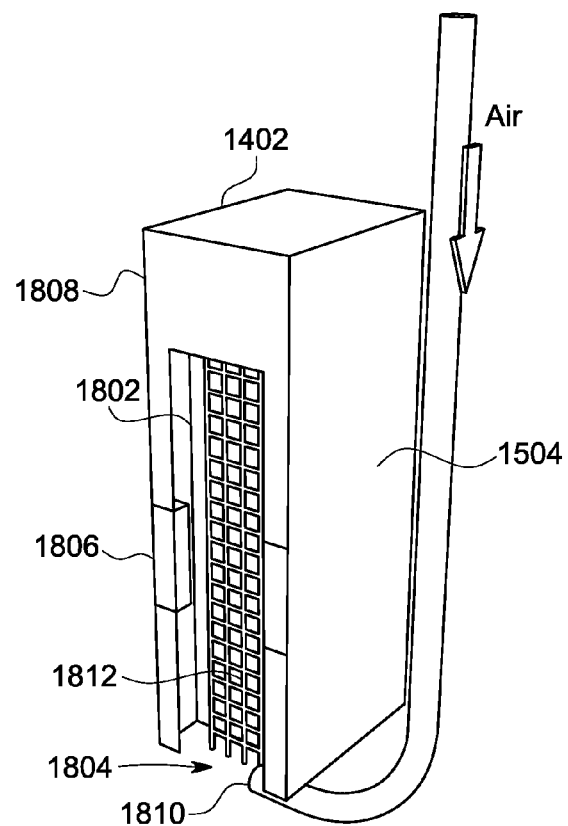
FIG. 18 shows a detailed frontal perspective view of the small hang-on-glass UAS housing of FIG. 14, as per the embodiments of the present invention.

FIG. 18 shows the UAS 1402 of FIG. 14 removed from the aquarium and separated from the LED illumination mechanism or means. In this very small embodiment 1402, the macroalgal attachment material 1812 can be permanently coupled to the housing 1504 or to the illumination attenuation mechanism or means 1802, as one unified entity to make for ease of removal of the entire UAS 1402 for cleaning/harvesting. The water inlet area 1804 is defined by the aquarium glass on one side, the housing 1504 on two sides, and either the macroalgal attachment surface 1812 or the illumination attenuation mechanism or means 1802 on the last side. Whether the macroalgal attachment material 1812 or the illumination attenuation mechanism or means 1802 defines the side of the water inlet area 1804 depends on the material chosen to be the macroalgal attachment material 1812; a non-porous material would cause the attachment material 1812 to define the water inlet area 1804, whereas a porous or open-mesh material would cause the illumination attenuation mechanism or means 1802 to define the water inlet area 1804. Also seen in this drawing is the proximity of the gas supply tube outlet 1810 to the bottom of the macroalgal attachment material 1812. This not only allows the gas bubbles which emit from the gas supply tubing outlet 1810 to traverse the entire length of macroalgal attachment material 1812 while in contact with and rubbing against the surface 1812, but it makes for a convenient attachment point for the gas supply tubing, since tie-wraps or fishing line or other non-corrosive securing method can be wrapped around the tubing and the attachment surface 1812, especially for do-it-yourself projects. The docking mechanism or means 1808, embodied here as a first docking surface 1808 which is flat to complement the flat aquarium glass wall, could in other embodiments be shaped to complement other aquarium wall shapes such as circular, bow front, or curved corners, or docking surface 1808 could be shaped to fit into an aquarium corner by employing a second docking surface, whereby the second docking surface is connected at an angle to the first docking surface 1808 such that the two surfaces complement the corner of the aquarium. Such a connection angle between first and second docking surfaces might be 90 degrees. More docking surfaces may be used in other embodiments, and connection angles other than 90 degrees may be used, as needed to fit the pertinent aquarium walls.

Figures 19, 20:
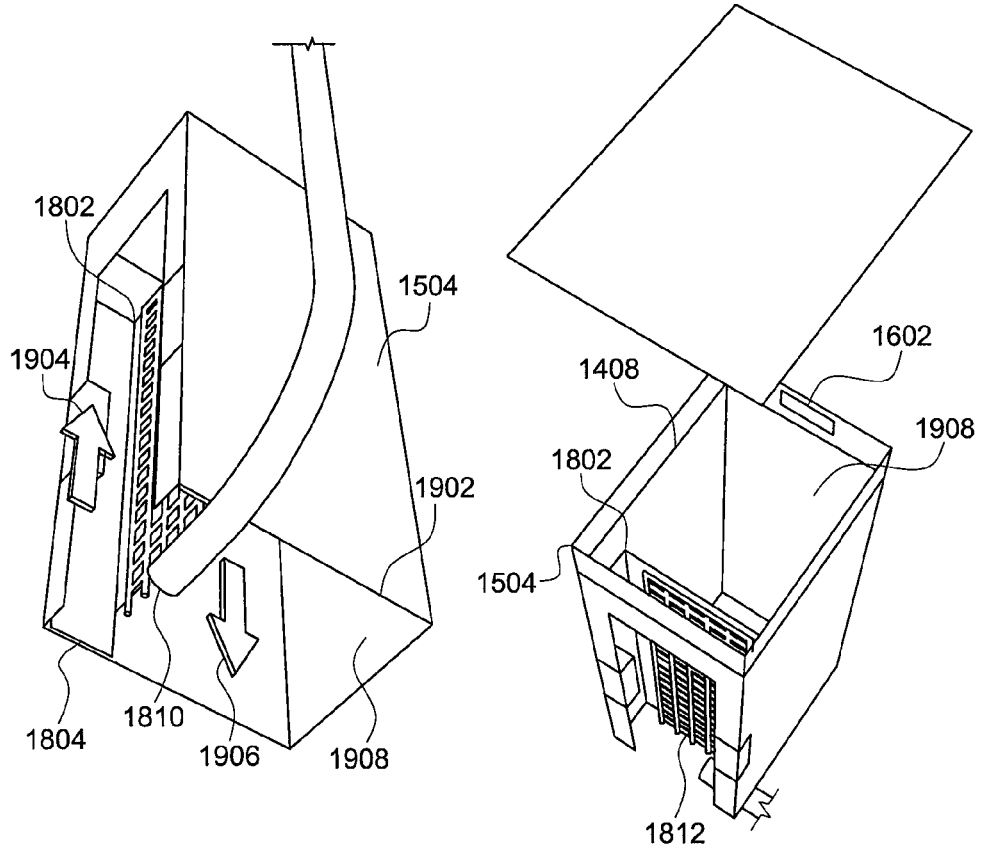
FIG. 19 shows a bottom perspective view of the small hang-on-glass UAS housing of FIG. 14 showing the single water inlet/outlet.
FIG. 20 shows a partially exploded top view of the small hang-on-glass UAS scrubber of FIG. 14 showing the attached illumination attenuator.

FIG. 19 shows a bottom perspective view of the small UAS embodiment of FIG. 14. The gas tubing outlet 1810 is positioned such that the gas bubbles emerging from the tubing outlet 1810 mix with water in the water inlet area 1804 and traverse up the macroalgal attachment material while staying in contact with and rubbing against the attachment material. This rubbing of gas bubbles against the attachment material is what generates the "wet, dry, wet, dry" action that delivers carbon directly to the macroalgae via the $CO_2$ in the air of the gas bubbles. The flow of the gas/water mixture traversing up the macroalgal attachment material is shown by the arrow 1904; this gas/water mixture travels to the top of the UAS housing 1504 where the gas bubbles explode at the water surface inside of housing 1504. The remaining water (substantially without gas bubbles) travels back down the UAS housing 1504 through the water return compartment 1908, which is on the opposite side of the illumination attenuation wall 1802 from the upwards traveling gas/water mixture, and this downward flow is shown by the downward arrow 1906. The macroalgal attachment material, in this case a roughed-up cross-stitch plastic canvas material, is allowed to extend beyond the bottom of the housing 1504 and illumination attenuation wall 1802 so that the gas supply tubing can be secured to it by plastic tie-wraps, fishing line, or other non-corrosive securing method. Since this embodiment would be attached further up an aquarium wall, the open-bottom is used for the water outlet 1902. Other embodiments are envisioned, however, whereby the housing 1504 bottom is not open, and instead has a smaller water inlet and outlet, either separate or combined, either on the bottom or on the sides of housing 1504. In another embodiment the illumination attenuation mechanism or means 1802 need not be included, thereby allowing gas and water to flow through the porous macroalgal attachment surface.

Of note also in this drawing is that the illumination attenuation mechanism or means 1802 is coupled on its sides, with no gaps, to housing 1504. In narrow embodiments such as this one, gas bubbles will easily route sideways around the macroalgal attachment surface, and thus the sides of the illumination attenuation mechanism or means 1802 should be coupled to the UAS housing 1504 in for efficient operation. If narrow embodiments with macroalgal attachment surfaces less that about 10 cm wide do not have an illumination attenuation mechanism or means which are closed coupled to their outer housings, they can readily loose much of their filtering capacity by even a small amount of algal growth, because such growth re-routes a large portion of the gas bubbles sideways around the growth and macroalgal attachment material.

FIG. 20 shows a partially exploded top perspective view of the UAS embodiment of FIG. 14. It can be seen here how the top of the macroalgal attachment material 1812 and the illumination attenuation wall 1802 are lower than the water surface 1408 and housing 1504 top. This enables the gas/water mixture to flow up the macroalgal attachment material 1812, where the gas/water mixture then flows along the water surface 1408; the gas bubbles explode at the surface 1408 and leave the water with few gas bubbles to return downward through the water return compartment 1908. This delivers substantially bubble-free water back to the aquarium. Also shown is the placement of the gas outlet vent 1602, which is kept above the aquarium water surface 1408 in order to allow gas from the exploded bubbles to exit the housing 1504 without forcing the gas back into the aquarium water. The UAS housing lid, show exploded here, may be permanently attached to the housing 1504, or may be releasably coupled to the housing 1504 using clips, detents, friction, peg and hole, other mechanism or means, including no method at all. Other embodiments might have the gas outlet vent 1602 placed in the lid instead of the housing. Still other embodiments might have multiple gas outlet vents 1602, either on the side or top of housing 1504. Lastly the illumination attenuation mechanism or means 1802 can be seen to be coupled to the sides of housing 1504, thus not allowing any gas bubbles to route around and thus bypass macroalgal attachment material 1812, which gas bubbles will tend to try to do on narrow macroalgal attachment materials such as this.

Figures 21, 22:
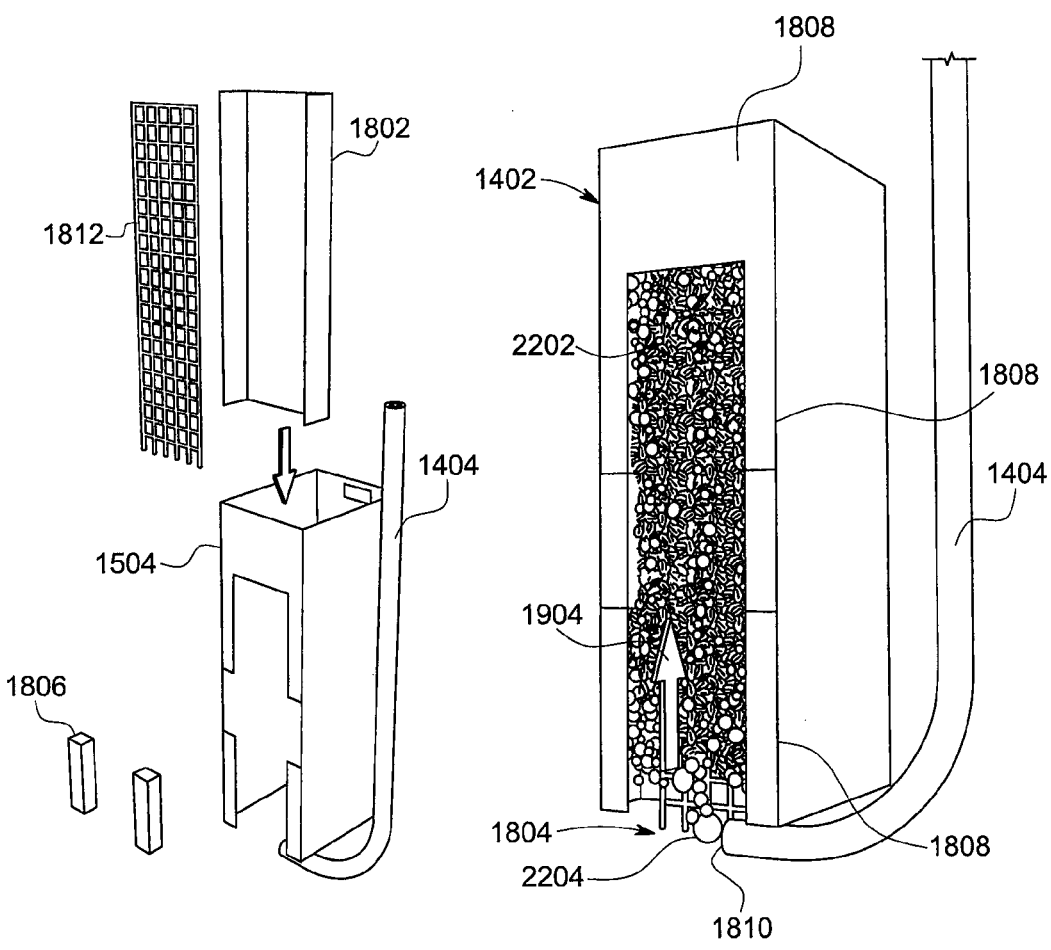
FIG. 21 shows an exploded perspective view of the small hang-on-glass UAS scrubber of FIG. 14.
FIG. 22 shows a perspective view of the small hang-on-glass UAS scrubber of FIG. 14 illustrating its macroalgal growth.

FIG. 21 shows an exploded view of the UAS embodiment of FIG. 14. This embodiment is designed for do-it-yourself hobbyist construction and thus is made primarily of common rectangular plastic tubing, although other embodiments might use other materials or shapes. The macroalgal attachment material 1812 is typically made by roughening a sheet of cross-stitch plastic canvas of the 7-mesh size, and attaching this to the illumination attenuation wall 1802. However, it should be understood that any material that sufficiently allows macroalgae to attach and grow may be used, including but not limited to nets, mesh, serrated plastic or heavily scratched acrylic, or appendages. Also, if the macroalgal attachment material 1812 is chosen to be a non-porous material such as but not limited to a solid sheet of plastic, then the illumination attenuator wall 1802 may not be needed. The illumination attenuation wall 1802, with macroalgal attachment material 1812 attached, is inserted into housing 1504, and the sides of illumination attenuator wall 1802 are attached to housing 1504 using an adhesive meant for the material being used. The walls of housing 1504 may need to be spread out in order to accommodate the illumination attenuation wall 1802 if the wall 1802 and the housing 1504 are made from the same size of rectangular tubing. The magnets 1806, air supply tubing 1404, and lid are then attached. And while this embodiment could be built by do-it-yourself hobbyists, manufactured embodiments are envisioned whereby the macroalgal attachment material 1812, illumination attenuation mechanism or means 1802, housing 1504, and lid are molded in a commercial manufacturing method such as injection molding. Still other embodiments might use mounting methods other than magnets, such as hooks, suction cups, hook-and-loop material, or any other method which allows the housing 1504 to be removed for cleaning Multiple magnets, or a single magnet, could also be used. Alternatively, a rock or decoration in the aquarium might be used to pin the housing 1504 against the aquarium wall. And in other embodiments the air supply tubing 1404 might be square or rectangular, rigid or flexible, and could be molded into the side of the housing 1504. Alternatively, the air supply tubing 1404 could be routed from underneath the housing 1504 instead of from above it. It is envisioned that the entire assembly could be one unified component.

FIG. 22 shows a perspective view of the UAS embodiment of FIG. 14 in operation but without the illumination mechanism or means or the aquarium. As gas travels down the gas supply tubing 1404, gas bubbles 2204 are emitted from the gas supply tubing outlet 1810 and mix with the water in the water inlet area 1804, and this gas/water mixture travels upwards following the arrow 1904, in contact with and rubbing against the macroalgal attachment material and any macroalgae growth 2202 thereon. The gas/water mixture then travels to the top of the housing 1402 where the gas bubbles 2204 explode at the water surface inside the housing. Docking mechanism or means 1808, which is a flat surface in this embodiment, does not utilize a sealing mechanism or means, although other embodiments could. In one embodiment, docking mechanism or means 1808 could be a wall of soft material such as rubber or silicon that is coupled to the housing, and thus would become the sealing mechanism or means as well. In other embodiments, this wall of soft material could encase a magnet, the way a refrigerator door often encases magnets in its door seals, or the wall of soft material could be shaped into suction cups, so as to be the docking mechanism or means, sealing mechanism or means, and coupling mechanism or means. In still other embodiments, there could be multiple gas tubing outlets 1810.

Figure 23:
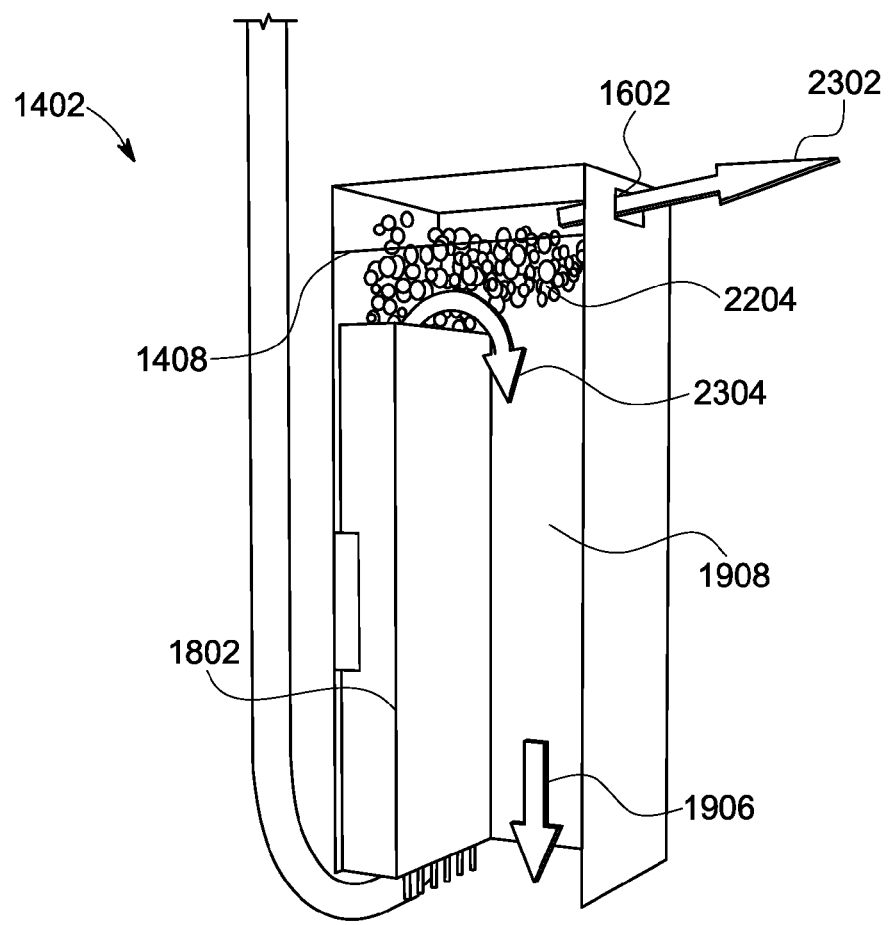
FIG. 23 shows a cutaway side view of the small hang-on-glass UAS housing of FIG. 14 illustrating the confinement of gas bubble flow by the illumination attenuator.

FIG. 23 shows a cutaway perspective view of the UAS embodiment of FIG. 14. Here can be more clearly seen how the gas/water mixture that traveled up the macroalgal attachment material reaches the water surface 1408 and then separates, with the gas bubbles 2204 exploding and releasing the gas which exits the gas outlet vent 1602 (shown by arrow 2302), and the water turning back downwards substantially bubble free, following the arrow 2304 down through the water return compartment 1908, following the arrow 1906 and finally exiting the bottom of the UAS housing.

Illumination attenuation mechanism or means 1802 prevents the downward flowing water in compartment 1908 from combining with upflowing water on the macroalgal attachment material, because the illumination attenuation mechanism or means 1802 is attached/sealed to the sides of the UAS housing. The inside volume of the UAS housing in different embodiments could be altered so as to provide more or less water surface area 1408. This variation in water surface area 1408 might be to slow down or speed up the amount of time that the gas bubbles 2204 remain at the water surface 1408. For example, an embodiment with a much larger water surface area 1408 would allow the gas bubbles 2204 to slow down considerably, and stay at the water surface 1408 longer, thereby allowing more of the gas bubbles to explode before turning back down the water return compartment 1908. Water surface 1408 in another embodiment could also be made to be larger or smaller than the cross sectional area of the main UAS housing, by reducing or enlarging the cross sectional area of the uppermost portion of the UAS housing. Lastly, illumination attenuation mechanism or means 1802 is positioned such that illumination shining in the illumination port (not shown) will be reduced before said illumination exits the bottom of the UAS housing.

Figure 24:
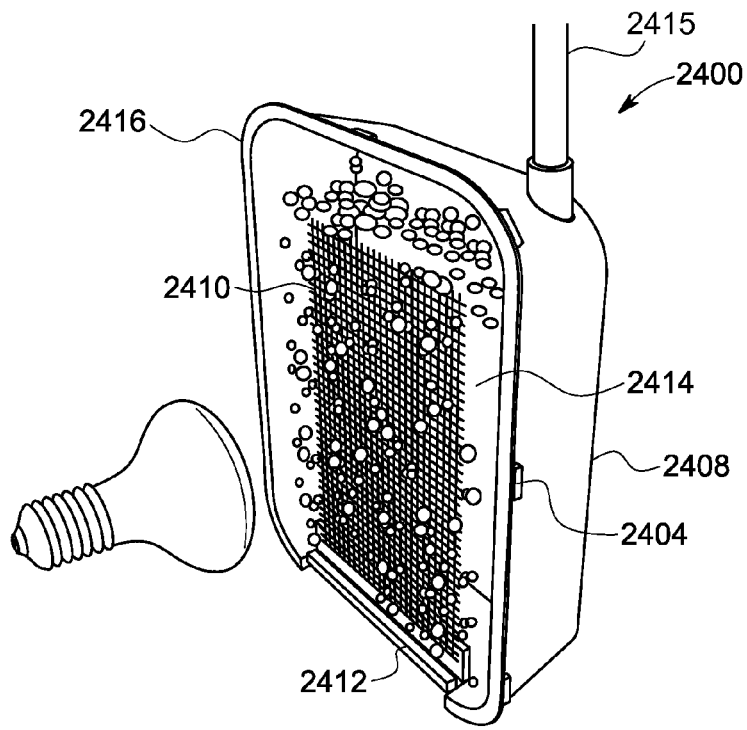
FIG. 24 is a front perspective view of a larger hang-on-glass UAS scrubber according to another embodiment of this invention.

FIG. 24 shows a front perspective view of a larger do-it-yourself embodiment of a hang-on-glass UAS with bubble remover 2400, possibly made with a modified household food container. This embodiment 2400 does not use an illumination attenuator; instead it's water outlet (not shown) is kept small so as to restrict as much illumination as possible from escaping into the aquarium. The docking mechanism or means 2416 is a narrow flat surface to complement the shape of flat aquarium glass, although in other embodiments the docking surface 2416 could instead be curved to match bowfront or circular aquariums, or it could have two separate surfaces 2416 joined at an angle so as to fit into an aquarium corner. The docking surface 2416 is lined with a sealing mechanism or means so as to prevent gas bubbles from escaping into the aquarium, although embodiments are envisioned where the sealing mechanism or means is not used, and gas bubbles are allowed to escape between the docking surface 2416 and the aquarium glass.

The gas outlet vent 2402 is cut out at the top, although other embodiments might have a series of smaller holes or slots, either placed on top of housing 2408 or on the sides of housing 2408, near the top. Magnets 2404 couple to the magnets on the outside of the aquarium (not shown) in order to position the housing 2408 on the aquarium glass in the proper location such that gas outlet vent 2402 is above the aquarium water surface. Other methods of securing the UAS housing 2408 to the aquarium wall, and aligning housing 2408 with the illumination mechanism or means, may be used such as clips, dowels, hooks, elastic bands, pins, hook-and-loop material, suction cups, or it could be held in place by another object in the aquarium, whereby the other object pins the housing 2408 to the aquarium wall. Alternatively, if bubble removal is not desired, the entire housing 2408 could be placed farther down the aquarium wall such that no part of the housing 2408 were above the aquarium water surface. In this submerged case, a hose or tubing could also be attached to gas outlet vent 2402 such as to route the gas to above the aquarium water surface.

In the current embodiment, the bubbling mechanism or means 2412 is located very near the aquarium glass, possibly within 1 mm of the aquarium glass. This placement prevents foreign matter and livestock from entering the housing 2408, without requiring a separate screening mechanism or means. In operation, water enters the water inlet at the bottom of the housing 2408 between the bubbling mechanism or means 2412 and aquarium glass; it then mixes with the gas bubbles from the bubbling mechanism or means 2412 and the gas/water mixture travels up the macroalgal attachment material 2410 while in contact with and rubbing against the attachment material 2410 and any algal growth thereon. The gas/water mixture then reaches the water surface inside housing 2408, where the bubbles explode inside the housing 2408, thus releasing gas which exits gas outlet vent 2402. The remaining water turns back downwards substantially bubble free, through the water return compartment 2414 on the other side of the macroalgal attachment surface 2410, where the water finally exits the water outlet at the bottom of the housing 2408, thus returning to the main aquarium area. The macroalgal growth mechanism or means, which in this embodiment consists of the first macroalgal attachment material 2410, first bubbling mechanism or means 2412, and the illumination mechanism or means, could in other embodiments have more than one macroalgal attachment material, possibly with a divider separating them, such that each could operate independently. Such separate operation is useful, for example, when cleaning; by cleaning only one of the macroalgal attachment materials, the others will still contain macroalgal growth which will continue filtering.

Figure 25:
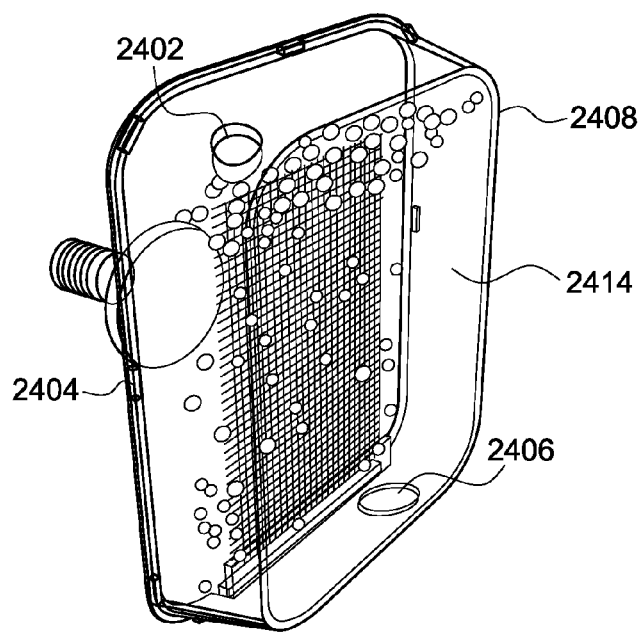
FIG. 25 is a rear perspective transparent view of the larger hang-on-glass UAS scrubber of FIG. 24.

FIG. 25 shows a transparent view of the other side of the UAS embodiment 2400 of FIG. 24. At the bottom can be seen the water outlet 2406 which in this embodiment is kept small so as to limit the amount of illumination exiting housing 2408. This water outlet 2406 could be covered with a screening mechanism or means, as could the water inlet, in order to keep foreign matter and livestock out. Alternately, this water outlet 2406 could be made smaller than any foreign matter or livestock in the aquarium, or, multiple smaller water outlets 2406 could be placed on the bottom of housing 2408 instead. Other embodiments are envisioned whereby several small ports of possibly 1 to 5 mm diameter are placed at the lower side walls of housing 2408 in addition to the bottom of housing 2408.

Yet another embodiment would be for water outlet 2406 to be attached to a tube (not shown) which extends downwards from housing 2408; such a tubing extension would reduce even further any bubbles and illumination from escaping from housing 2408. The accumulation of gas bubbles can be seen at the top of housing 2408 near where the water surface (not shown) would normally be; the bubbles explode there and the gas escapes out of the gas outlet vent 2402 which is kept above the water surface, whereas the water turns downwards substantially bubble-free through the water return compartment 2414 and exits the water outlet 2406 at the bottom of the housing 2408. The macroalgal attachment material could be held in place with any manner of pins, clips, dowels, rods, slots, fishing line, elastic bands, tie-wraps, friction, hook-and-loop tape, or could be hinged so as to fold out of the way to allow for cleaning behind it. For cleaning/harvesting, the entire UAS housing 2408 is removed from the aquarium, including the macroalgal attachment material; the attachment material can then be cleaned while still coupled to the housing, and the housing 2408 is then replaced back into the aquarium to continue growing. Or the attachment material can be removed from the housing 2408 and cleaned separately.

An alternative to the gas outlet vent 2402 is a gas vent tubing (not shown) coupled at its lower end to the gas outlet vent 2402, and extending upwards so that the tubing's upper end is above the surface of the aquarium water. This gas vent tubing would provide the ability for the housing 2408 to be totally submerged below the aquarium water surface, but would prevent gas bubbles from entering the main aquarium area. Gas would escape out of the housing 2408 through gas outlet vent 2402 and enter the gas vent tubing where the gas would then rise above the aquarium water surface. The upper end of the gas vent tubing, which is above the aquarium water surface, can be turned downwards towards the aquarium water surface (but still keeping the tubing outlet above the water surface) to prevent spraying of water into the space above the aquarium, any spraying would be downwards into the aquarium water. Also, a valve or other restriction could be added to the gas vent tubing anywhere along its length; this would help regulate the flow coming out of the tubing. The restriction could be a pinch-valve, gate valve, ball valve or similar, or the tubing's internal diameter could be selected to provide the restriction needed.

Figure 26:
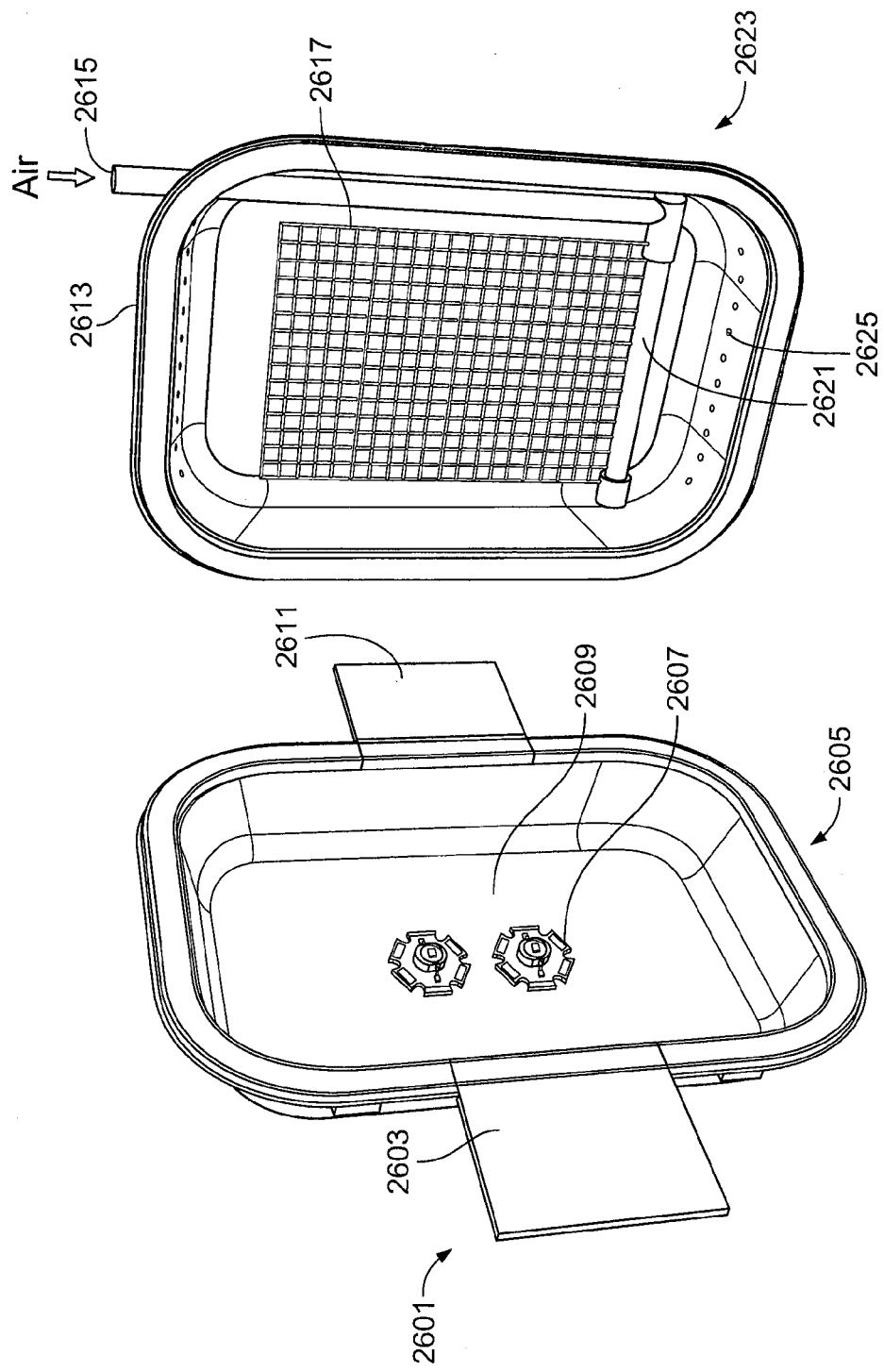
FIG. 26 shows an exploded view of the outside-portion and inside-portion of an upflow algae scrubber with heat radiation surfaces as per one embodiment of the current invention.

FIG. 26 shows an embodiment of the current invention that is a hang-on-glass UAS 2601 designed to be installed on a transparent aquarium wall (not shown). The outside portion 2605 of this UAS is coupled to the inside portion 2623 by magnets or other mechanism or means such as suction cups, elastic bands, hooks, brackets, hook-and-loop tape, or other non-corrosive methods or materials. If magnets are used, they shall be coated with epoxy, rubber, plastic, or other corrosion resistant covering. The cover of the outside portion 2605 could be made of plastic, resin, wood, metal, aluminum, any combination of these, or any other material which would remain rigid at the operating temperature of the illumination source 2607. The outside cover could provide thermal insulation if such insulation were desired, especially if said cover were made of such materials as wood, pressed cardboard, or foam. Alternately, no cover could be used, in which case illumination source 2607 could be held in place with a bracket. In some embodiments, dimensions for inside portion 2623 might be 5 to 100 cm wide, 10 to 200 cm tall, and 2 to 5 cm thick. In one embodiment, inside portion 2623 is 12.5 cm wide, 17 cm tall, and 2.8 cm thick.

Gas from a gas pump (not shown) travels down the gas supply tube 2615 to the bubbling mechanism or means 2621. Gas supply tube 2615 could be any gas delivery passage or conduit such as a vinyl hose or a compartment molded into or attached to cover 2613. Bubbling mechanism or means 2621 could be an airstone, woodstone, tubing with bubble ports/slots (including a vinyl tubing with a slot and cross-cuts as described in U.S. provisional application 61/657,024, filed Jun. 8, 2012), or a separate compartment with bubble ports or slots molded into or attached to cover 2613. Gas supply tube 2615 could have internal passage dimensions ranging from 2-15 mm, and bubbling mechanism or means 2621 might have internal gas passage dimensions ranging from 5-30 mm. Gas supply tube 2615 and gas bubbling mechanism or means 2621 could be glued to cover 2623, or could be removably attached by clips, detents, friction fit or other method so that gas supply tube 2615 and gas bubbling mechanism or means 2621 could be cleaned separately from cover 2613. Cover 2613 would generally define an opening for gas supply tubing 2615 to enter, however other embodiments could have cover 2613 entirely open at the bottom, thus allowing gas supply tubing 2615 to enter there. The amount of gas delivered to bubbling mechanism or means 2621 is in the range of about 0.01 to 1.0 liters per minute per lineal cm of bubbling mechanism or means length. One embodiment, with a bubbling mechanism or means length of 7.5 cm and a gas pressure of about 1.0 p.s.i., has a gas flow of about 0.5 liters per minute.

Water from the aquarium enters the water inlets 2625 at the bottom of cover 2613; the resulting gas bubble and water mixture (not shown) then traverse up the macroalgal attachment material 2617, staying in contact with and rubbing against material 2617 so as to deliver a "wet, dry, wet, dry" effect via the dry gas inside of the gas bubbles. If the inside portion 2623 of the UAS is placed so that part of it is above the aquarium water surface (not shown), then the gas bubbles will reach this surface inside of cover 2613 and explode, subsequently enabling only gas to escape out of the gas outlets at the top of the cover 2613, while water turns back downward substantially bubble-free and escapes back into the aquarium via either the small spaces between the cover 2613 and the aquarium wall (not shown), or water outlet ports (not shown) on the sides of cover 2613, or both. Alternately, if the inside portion 2623 is positioned completely submerged under the aquarium water surface, both gas bubbles and water will escape out of the gas outlet vents at the top of cover 2613.

While gas bubbles and water are traversing up the macroalgal attachment material 2617, attachment material 2617 is illuminated by an illumination source 2607 on the outside of the aquarium wall. This illumination combined with the gas bubbles and attachment material 2617 allows macroalgae to attach to and grow on the macroalgal attachment material 2617. This growth is then periodically harvested, thus providing nutrient removal from the aquarium.

Heat that is generated by aquarium illumination sources in prior art aquarium illumination systems is usually conducted into the ambient air around the aquarium by the use of heat sinks or fans. Such traditional heat sinks or fans, if used on the outside portion 2605 of the UAS, would be bulky and can cause the outside portion 2605 to slide down the aquarium wall. Also, it may require ventilation ports to be used on outside portion 2605, which would allow illumination to escape into the area or room surrounding the installation. The embodiments of the present invention, allow cooling of illumination source 2607 without external heat sinks, fans, or ventilation ports.

Heat that is generated by illumination source 2607 is conducted into the first heat absorption surface 2609. This first heat absorption surface 2609 might be made of metal or aluminum, or a metal or aluminum foil, that is attached to the outside cover by glue, friction, or a melted fit, or it might be a metalized deposition or a metalized paint or plating. The thickness of the first heat absorption surface 2609 would be sufficient to transfer enough heat away from illumination source 2607 so that illumination source 2607 would operate within it's design temperature parameters. Such a first heat absorption surface 2609 thickness might range from 0.1 mm for an illumination source 2607 of 2 watts, to 2.0 mm for an illumination source 2607 of 20 watts.

Illumination source 2607 is shown to be two 3-watt LEDs of the 660 nanometer spectrum, and these types of LEDs have a heat-sink base designed to be mounted on a heat-conductive surface and thus can be mounted using heat-conductive adhesive or with heat-conductive grease and attachment hardware. Other sources of illumination could be utilized such as compact fluorescent (CFL) bulbs; these other sources could also be mounted in such a way as to draw heat from them into the first heat absorption surface 2609. Other embodiments might have several 1-watt LEDs or other illumination sources arranged in a grid across first heat absorption surface 2609; these LEDs could be of the approximately 660 nanometer spectrum (red), and might also include some 450 nanometer spectrum (blue) as commonly used in plant-growth illumination units. White LEDs could also be used if the user dislikes the red colors. As an alternative to a grid pattern of several LEDs or other illumination sources, fewer of them (or a single one) might be placed in the center of first heat absorption surface 2609 and have a lens, prism, or diffuser placed over them/it. Generally, if an embodiment uses higher power LEDs or other illumination sources, they will be spaced farther apart than lower power ones would be. One embodiment places two 3-watt LEDs approximately 5 cm apart (center to center). Other embodiments which utilize compact fluorescent (CFL) bulbs, especially CFL "floodlight" bulbs which have built-in reflectors, might have the base of the bulbs protruding out of the outside cover, having only the illumination-emitting portion of the bulbs inside the outside cover. Small embodiments might only utilize a single CFL bulb, whereas larger embodiments might have several bulbs spaced apart. For example, an outside cover of width 30 cm and height 50 cm might have 12 total CFL bulbs: 3 columns of 4 bulbs each, with each bulb being about 15 watts for a total of 180 watts. The spectrum of these bulbs is preferred to be in the 2700 k to 3000 k range, however spectrums up to about 6500 k have been utilized with useful results. Still other embodiments might utilize other illumination sources, however any such source would position the illumination-emitting portion of the source inside of the outside-cover, and preferably in mechanical contact with first heat absorption surface 2609, so that sufficient heat is removed by first heat absorption surface 2609 such that illumination source 2607 remains within its manufacturer's operating temperature ranges.

Heat that is absorbed by first heat absorption surface 2609 is subsequently transferred to the first heat radiation surface 2603 or the second heat radiation surface 2611 where it is then conducted via thermal conduction into the aquarium wall, and finally into the aquarium water. First and second heat radiation surfaces 2603, 2611 could be any material which conducts sufficient heat away from first heat absorption surface 2609, such as metal, metalized resin, heat conductive plastic or ceramic, aluminum, or a combination thereof. The size and shape of first and second heat radiation surfaces 2603, 2611 would be such as to provide sufficient heat reduction of illumination source 2607, taking into consideration the heat being generated, the thickness and material (glass, acrylic) of the aquarium wall, and the maximum aquarium water temperature to be expected, but in all cases heat radiation surfaces 2603, 2611 would complement the shape of the aquarium wall it was positioned on. Two 3-watt LEDs, as per this drawing, might only require the rim of the outside cover to transfer enough heat to the aquarium wall, whereas higher wattage illumination sources 2607 would require larger contact surface areas as shown by first and second heat radiation surfaces 2603, 2611. Contact pressure of first and second heat radiation surfaces 2603, 2611 against the aquarium wall becomes more pertinent with higher wattages; stronger magnets or other attachment mechanism or means may have to be utilized with higher wattage sources in order to conduct sufficient heat into the aquarium wall, and finally into the aquarium water.

Figures 27, 28:
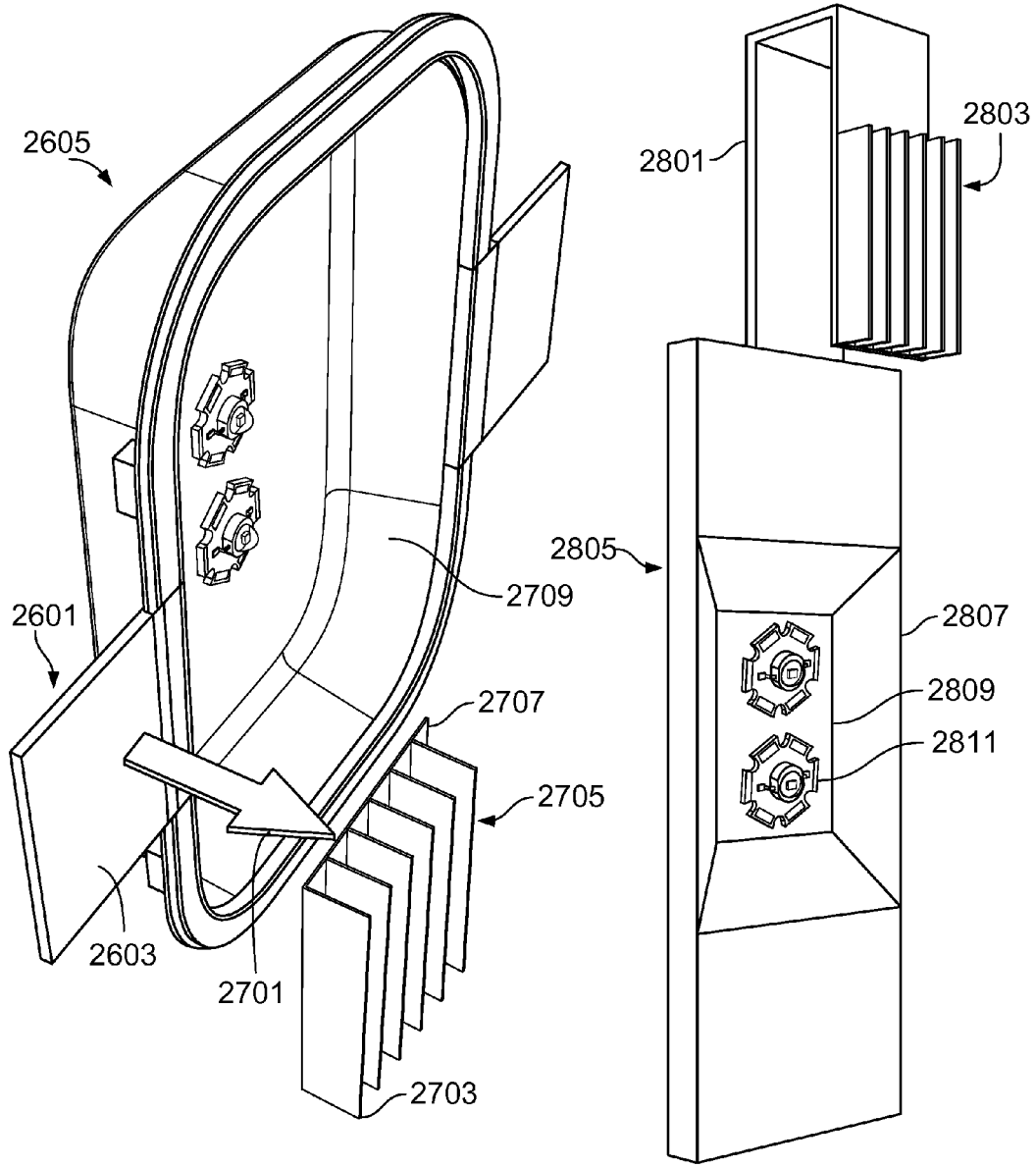
FIG. 27 shows a perspective view of FIG. 26 with a heat receiving surface added.
FIG. 28 is a perspective view of another embodiment of the current invention utilizing a heat carrier.

FIG. 27 shows another embodiment of the current invention. In this embodiment, a heat sink mechanism or means 2705 has been added to the inside of the aquarium, allowing more heat to be removed from illumination source 2607, and a first illumination reflector 2709 has been added, allowing more illumination to be directed through the aquarium glass to the macroalgal attachment material 2617. Heat is absorbed by the first heat absorption surface 2609, which transfers the heat to the first heat radiation surface 2603. Heat is then radiated from the first heat radiation surface 2603, through the aquarium glass (not shown) via thermal conduction [arrow 2701] to the first heat receiving surface 2707, where the heat flows into the first heat dissipation surface 2703 and finally into the aquarium water. The size of the first heat radiation surface 2603 and first heat receiving surface 2707 would be of sufficient size to transfer enough heat through the aquarium glass based upon the wattage of the illumination source 2607, thickness and material (glass, acrylic) of the aquarium wall, insulation of the outside cover, and desired operating temperature of illumination source 2607. For example, a small illumination source 2607 of two 3-watt LEDs, as per this drawing, installed on a small aquarium with a 3 mm thick glass wall might only require a first heat radiation surface 2603 area of 5 square cm., which could have a matching first heat receiving surface 2707 of 5 square cm. The size of the first heat dissipation surface 2703 would be proportional to the size of the first heat receiving surface 2707, and also proportional to the amount of heat needing to be dissipated into the aquarium water while taking into consideration how much space inside the aquarium would be used by heat sink mechanism or means 2705.

Heat sink mechanism or means 2705, comprising first heat receiving surface 2707 and first heat dissipation surface 2703, can be made of similar materials to the first heat absorption surface 2709, e.g. metal, metalized resin, heat conductive plastic or ceramic, aluminum, or any combination thereof. The first heat dissipation surface 2703, and subsequent dissipation surfaces coupled to first heat receiving surface 2707, can be aligned vertically so as to help generate a vertically rising water current inside of the aquarium; this will bring more cooler water into contact with the first heat dissipation surface 2703 as the cooler water travels up first heat dissipation surface 2703 while being heated by first heat dissipation surface 2703. First heat sink mechanism or means 2705 could be coupled to inside cover 2613, and thus be secured to the aquarium wall by the magnets or other attachment devices of cover 2613, or first heat sink mechanism or means 2705 could be individually coupled to the aquarium wall with its own attachment mechanism such as magnets, suction cups, elastic bands, thermal adhesive, or friction fit. If individually coupled to the aquarium wall, first heat sink mechanism or means 2705 could remain in the aquarium when inside cover 2613 is removed for cleaning.

First heat dissipation surface 2703 could be of a height that approximately matches the height of first heat radiation surface 2603, which might range from 20-150 mm, or it could be smaller such that first heat radiation surface 2603 is taller than first heat dissipation surface 2703. First heat dissipation surface 2703 could be any shape which sufficiently transfers enough heat into the aquarium water; some embodiments employ the linear "fins" that are used on traditional heat sinks; however, decoratively shaped designs such as pins, radials fans, spirals, or bars could be used. Other embodiments might also permit the first (and subsequent) heat dissipation surfaces 2703 to be rotated so as to match the water flow direction from a nearby water pump outlet. The number of heat dissipation surfaces 2703 is proportional to the width of the first heat receiving surface 2707, and generally spaces the heat dissipation surfaces 2703 about 0.5 to 2.0 cm apart from each other. Cleaning between the heat dissipation surfaces 2703 is often needed, so allowing enough space for a brush between heat dissipation surfaces 2703 will keep the surfaces operating at best efficiency. For example, one embodiment uses a first heat receiving surface 2707 of 50 mm high by 50 mm wide, with 50 mm high dissipation surfaces 2703 that extend 10 mm into the aquarium water, and are spaced 10 mm apart which provides six dissipation surfaces 2703. Lastly, an alternate embodiment might have a solid metal or aluminum connection 2701 going through the aquarium wall so that heat can travel from first heat radiation surface 2603 to first heat receiving surface 2707 through a better conductor than might be expected when traveling through typical aquarium materials such as acrylic or glass. Such a solid connection 2701 could be integrated into the aquarium construction.

Illumination from the illumination source 2607 is reflected by the first illumination reflector 2709 so that less illumination is absorbed by the outside cover and more illumination is directed to macroalgal attachment material 2617 on the inside of the aquarium glass (not shown). First illumination reflector 2709 could be an extension of first heat absorption surface 2609, as it is in this drawing, or it could be a separate component or surface coupled to first heat absorption surface 2609. First illumination reflector 2709 might be made of glass mirror, plastic mirror, acrylic mirror, polished metal or aluminum or chrome, metalized paint or deposition or plating, or a white paint, coating or dipping, or combinations thereof. For economy of manufacture, first heat absorption surface 2709, first heat radiation surface 2603, first illumination reflector 2709, and the outside cover might all be made of one continuous homogeneous material.

FIG. 28 shows a UAS illumination heat transfer apparatus embodiment that uses a heat carrier to transfer heat over the top of the aquarium wall instead of through the aquarium wall. This embodiment might be useful in aquariums which have open-tops, e.g. no lids or hoods. In this embodiment, heat from the illumination source 2811 is absorbed by both the first and second heat absorption surfaces 2809 and 2807; both surfaces transfer the heat to the heat carrier 2801 which routes the heat upwards and over the top of the aquarium wall (not shown) and then down into the aquarium water (not shown) where the heat carrier 2801 couples to the first heat receiving surface of heat sink mechanism or means 2803. The first heat receiving surface of heat sink mechanism or means 2803 then transfers the heat to the first heat dissipation surface of heat sink mechanism or means 2803, which finally transfers the heat into the aquarium water. The heat carrier 301 may be made of any material which transfers heat sufficiently from the heat transfer mechanism or means 2805 to the heat sink mechanism or means 2803, such as metal or aluminum or unidirectional carbon fiber. The thickness and/or width of heat carrier 2801 would increase in proportion to the illumination source 2811 wattage, and the distance that the heat carrier 2801 must transport the heat. A typical heat carrier 2801 for 20 watts of LED illumination might be aluminum that is 3 mm thick and 60 mm wide, or steel that is 1 mm thick and 40 mm wide. Metal components would need to be coated with a protective anti-corrosion coating.

Illumination from an illumination source 2811 is reflected by first illumination reflector 2807, which in this embodiment is also the second heat absorption surface 2807. This first illumination reflector 2807 helps direct more illumination through the aquarium wall to the macroalgal attachment surface 2617. Illumination source 2811 and heat transfer mechanism or means 2805 take up minimal space on the aquarium viewing glass but can still provide sufficient illumination reflection and heat transfer. This embodiment might be made up entirely of a single piece of heat conductive and polished metal.

The gas bubbles in an upflow algae scrubber can be generated by many conventional mechanism or means, such as airstones, woodstones, bubble port tubing, etc., however these tend to accumulate algal growth on themselves and thus require cleaning Attempting to clean an airstone or woodstone tends to push the algal particles further into the stone, thus clogging it; attempting to clean bubble ports tends to push algal pieces further down into the ports, thus blocking them. Bubble plates, however, can be made of smooth hard materials which resist algal attachment, and further, the bottom-side of the bubble plates can be cleaned easily by just wiping away any algal growth on them; this will push any algal pieces upwards and out of the holes, instead of further down into the holes. Bubble plates are also relatively easy to manufacture, since they are just solid sheet. The sides of bubble plates, however, must all be substantially sealed so as to contain the gas beneath the plates, such that the gas is forced to exit the gas passages through the plates. This sealing of the bubble plate poses a problem for "hang on glass" upflow algae scrubbers, because the scrubber is cut in half, with only "half" of the plate inside the aquarium. This cut-in-half condition would appear to not allow gas bubble plates to function with this type of scrubber.

The solid attached macroalgae that grow on the macroalgal attachment material must be removed (harvested) in order for the nutrients to be removed from the aquarium water. This is accomplished by removing the attachment material from the algae scrubber (or removing the whole scrubber), and scraping the algae off. The attachment material is then replaced back into the scrubber (or the whole scrubber is replaced back into the aquarium) for more growth to occur. When the inside portion of the upflow algae scrubber is removed, the gas bubbler can also be cleaned at that time.

Figure 29:
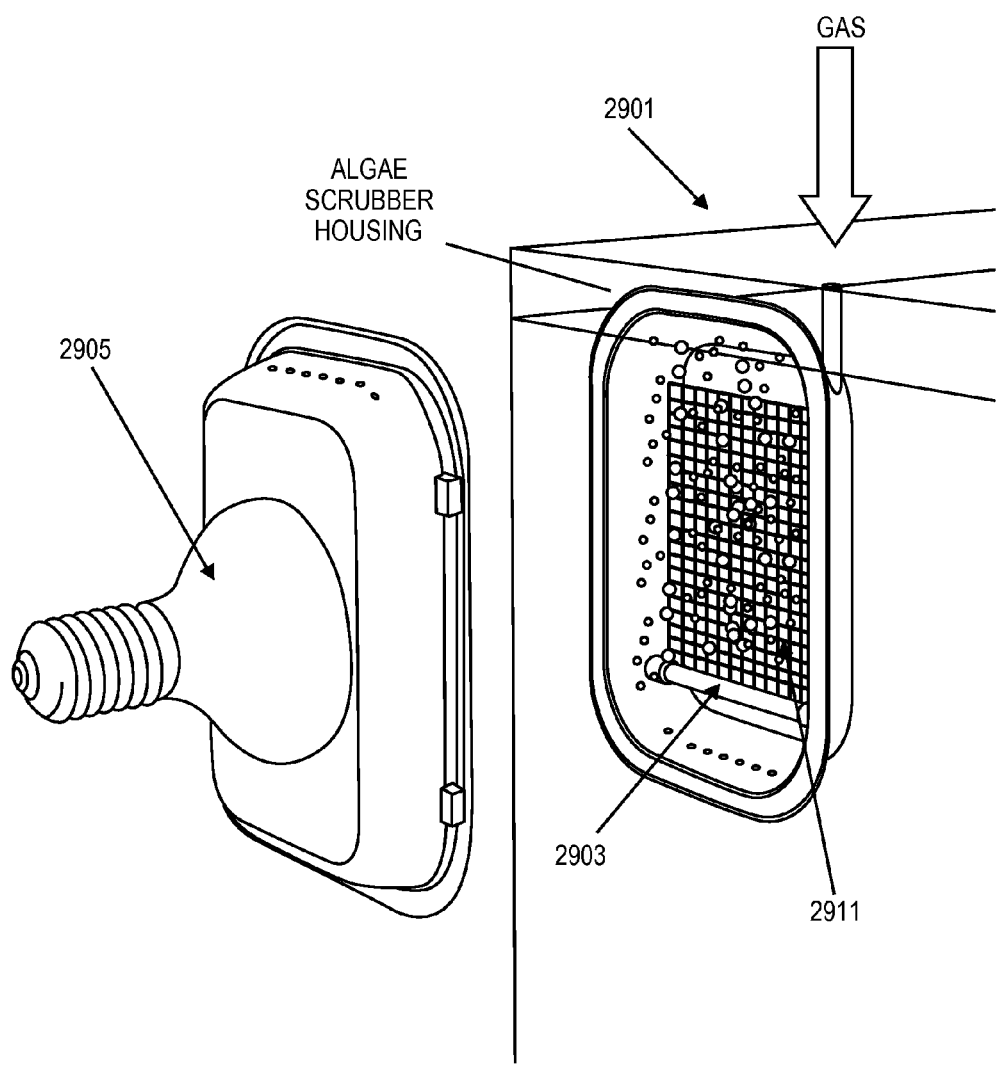
FIG. 29 is a frontal perspective exploded view of an aquarium with an upflow algae scrubber bubbler device.

FIG. 29 shows a hang-on-glass upflow algae scrubber 2901, where the in-aquarium portion includes a macroalgal attachment material 2911 and utilizes an airstone as the bubbling mechanism or means 2903, beneath the macroalgal attachment material 2911. Because the airstone is illuminated by the illumination mechanism or means 2905, the airstone grows algae on itself and starts to clog. Cleaning the airstone will only remove some algae, as many algal particles will lodge into the airstone material itself And accessing the hidden back side of the airstone is difficult, requiring the removal of the airstone. Some growth on the airstone can be reduced by shielding the airstone from the illumination, but this requires an additional opaque wall which must be removed or worked around in order to clean. And even if an additional opaque wall blocked all direct illumination, indirect illumination would still reach the airstone via the pathway that the gas bubbles must take upwards.

Figure 30:
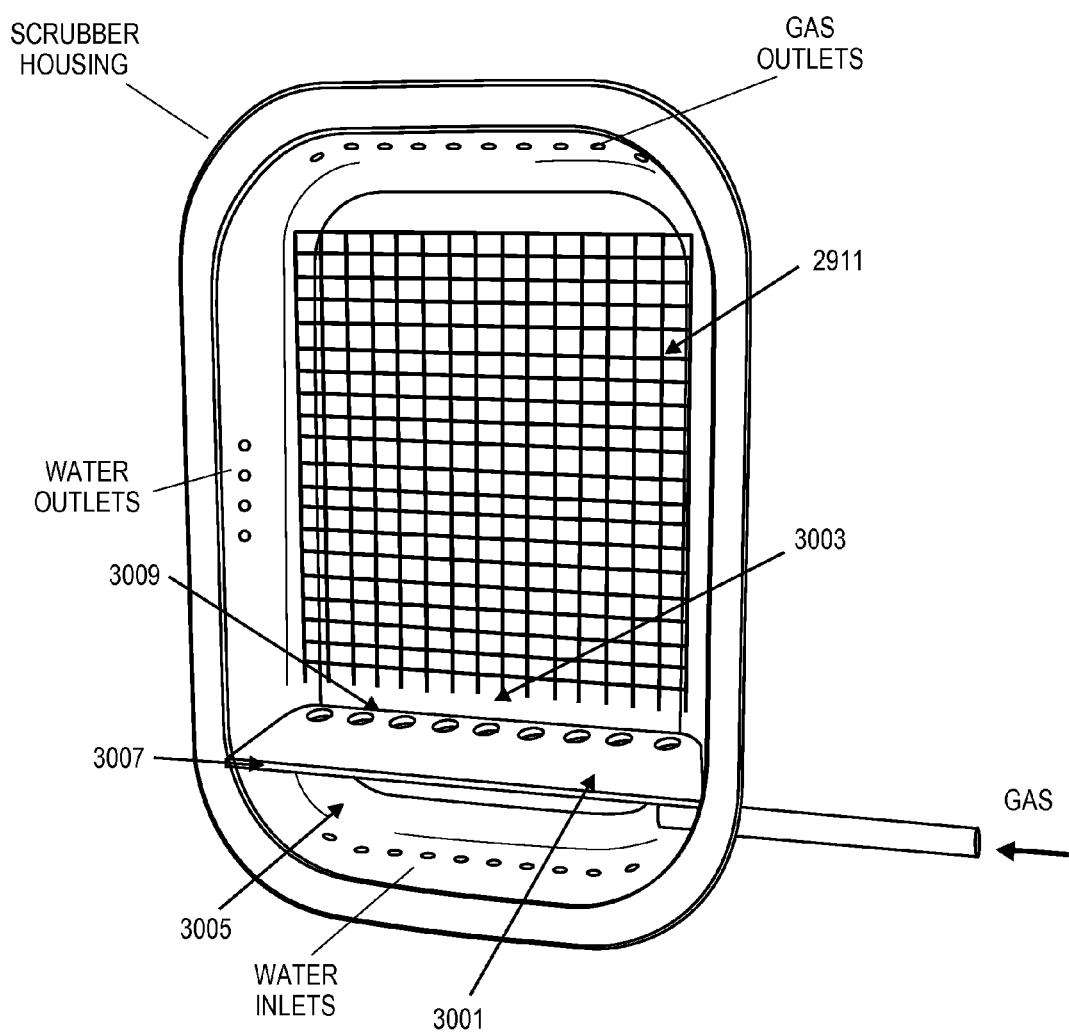
FIG. 30 is a frontal perspective view of just the in-aquarium portion of an upflow algae scrubber utilizing the present invention to supply gas bubbles.

FIG. 30 shows an embodiment of the current invention. The portion of the UAS sitting inside the aquarium in FIG. 29 has had the airstone replaced by an approximately horizontal shelf with gas passages 3003; this shelf becomes a gas bubble plate 3001, albeit divided in half. It may appear that gas would escape out of the front open area, especially with high pressure gas being injected underneath the gas bubble plate 3001, but surprisingly a substantial portion of the gas, if not all, will route as desired through the gas passages 3003 and thus proceed upwards along the macroalgal attachment material 2911. This is due to there being less gas flow resistance through the gas passages 3003 than there is between the gas bubble plate 3001 and the aquarium wall (not shown), although visually it may appear otherwise. Four advantages of this divided bubble plate 3001 become apparent:

First, because the divided bubble plate 3001 can be made of a smooth hard non-porous material such as plastic, very little algal attachment will occur on it, as opposed to how much growth occurs on a porous airstone. Second, any growth that does occur can be easily brushed off. Third, because the user is able to easily access underneath the gas passages 3003, any algal growth can be pushed upwards or outwards, instead of pushing the growth downwards into the area below the divided bubble plate 3001 where it would accumulate. And lastly, the area beneath the divided bubble plate 3001 is easily accessed by just lifting the UAS out of the water; no walls need to be moved or worked around, and no airstone or other bubbling apparatus need be dealt with. Operation of this embodiment is as follows:

Gas is injected into the UAS housing via the tubing on the right. The gas enters the housing underneath the divided bubble plate 3001, in the gas reservoir area 3005, and is kept from escaping around the front edge 3007 of the gas bubble plate because of the aquarium glass (not shown). Water also enters the gas reservoir area 3005 from the water inlets at the bottom of the housing. Because the gas cannot easily get around the front edge 3007 of the divided bubble plate, the gas escapes instead through the gas passages 3003 in the divided bubble plate 3001, subsequently pulling water with it, and the resulting gas bubble and water mixture travel up the macroalgal attachment material 2911 while staying in contact with the material. Water exits the water outlets on the sides of the scrubber housing; gas that reaches the top of the housing escapes out of the gas outlets there.

For harvesting of attached macroalgae on the macroalgal attachment material 2911, the entire portion of the scrubber shown in FIG. 30 can be removed from the aquarium and cleaned, for example in a kitchen sink, and the bubble divider plate 3001 can be easily brushed of any attached algal growth. The UAS is then replaced back into the aquarium for further operation. With no small pores or bubble ports to become clogged with algae, the divided bubble plate 3001 will allow indefinite operation that does not require replacement of clogged bubbler components.

Another embodiment of the invention, not shown, is where the back edge 3009 of the divided bubble plate 3001 is elevated higher than the front edge 3007 (e.g., "tilted"); this is useful if a very high volume or pressure of gas is to be used. The higher elevation of the back edge 3009 will help route the gas in the gas reservoir area 3005 away from the aquarium glass, and towards the gas passages 3003. Too much elevation difference, however, will make it difficult for the user to clean inside the gas reservoir area 3005. Perhaps a 10 to 45 degree tilt would be permissible, depending on the area of gas reservoir area 3005 facing the glass, the distance from the front edge 3007 to the back edge 3009 of the bubble plate 3001, and the volume of gas flow desired.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An apparatus for aquarium water filtration, comprising:
   a macroalgal growth mechanism defining a first macroalgal attachment surface and a first bubbling mechanism; and
   a containment mechanism including,
      a housing defining a first water inlet and a gas outlet.
      a docking mechanism defining a first docking surface, the first docking surface configured to complement a shape of an aquarium wall, the first docking surface defining a first illumination port, the first illumination port to enable illumination to pass through the illumination port to illuminate the macroalgal attachment surface, and a first coupling mechanism, the first coupling mechanism to secure the macroalgal growth mechanism to the containment mechanism such that a first portion of gas bubbles emitted by the macroalgal growth mechanism is substantially confined to the housing.

2. The apparatus of claim 1, further comprising:
an illumination attenuation mechanism defining a first substantially opaque surface; and
a second coupling mechanism, the second coupling mechanism to secure the illumination attenuation mechanism to the containment mechanism such that a first portion of illumination arriving through the illumination port is reduced in intensity before illumination exits the housing.

3. The apparatus of claim 2, wherein the housing and macroalgal attachment material are one unified entity.

4. The apparatus of claim 2, wherein the water inlet is located on a side of the housing.

5. The apparatus of claim 2, wherein the water inlet is located on the bottom of the housing.

6. The apparatus of claim 2, wherein the housing includes a height adjustment means movable from a first position to a second position, the height adjustment means including the gas outlet and configured to move a position of the gas outlet relative to the housing.

7. The apparatus of claim 2, wherein the docking surface has a plurality of illumination ports.

8. The apparatus of claim 2, wherein a first portion of the docking surface is transparent.

9. The apparatus of claim 1, wherein the attenuation mechanism is coupled to the sides of the containment mechanism so as to prevent gas bubbles from routing sideways around a macroalgal attachment surface.

10. The apparatus of claim 1, wherein the water inlet and water outlet are combined.

11. The apparatus of claim 1, further comprising:
an adjustable water inlet or outlet port defining a user-positionable port cover; and
a third coupling mechanism, the third coupling mechanism to secure the user-positionable port cover to the adjustable water inlet or outlet port such that a user can move the port cover from a first position to a second position,
whereby the second position provides a larger port opening and thus allows more water flow into or out of the containment mechanism in order to reduce dwell time.

12. The apparatus of claim 1, wherein the macroalgal attachment surface is disposed approximately 20 mm from the aquarium wall.

13. The apparatus of claim 1, further comprising:
a gas vent tubing; and
a fourth coupling mechanism, the fourth coupling mechanism to attach a lower end of the gas vent tubing to a gas vent outlet, and further position an upper end of the gas vent tubing above an aquarium water surface,
whereby gas in the upper portion of the containment mechanism will exit into the atmosphere instead of the aquarium water.

14. The apparatus of claim 1, wherein the bottom of the housing is flat to allow the housing to stand upright at the bottom of an aquarium or sump.

15. The apparatus of claim 1, wherein the water inlet is located on a side of the housing.

16. The apparatus of claim 1, wherein the water inlet is located on the bottom of the housing.

17. The apparatus of claim 1, wherein the housing includes a height adjustment mechanism movable from a first position to a second position, the height adjustment mechanism including the gas outlet and configured to move a position of the gas outlet relative to the housing mechanism.

18. The apparatus of claim 1, wherein the docking surface includes an illumination port adjustment mechanism, the illumination port adjustment mechanism moveable from a first position to a second position, the illumination port adjustment mechanism in the second position reducing a size of the illumination port relative to the first position.

19. The apparatus of claim 1, wherein a first portion of the docking surface is transparent.

20. The apparatus of claim 1, wherein the housing defines a water outlet separate from the water inlet.

* * * * *